US012170399B2

(12) United States Patent

Li et al.

(10) Patent No.: US 12,170,399 B2

(45) Date of Patent: Dec. 17, 2024

(54) BASE STATION ANTENNA, FEEDER COMPONENT AND FRAME COMPONENT

(71) Applicant: Outdoor Wireless Networks LLC, Claremont, NC (US)

(72) Inventors: YueMin Li, Suzhou (CN); Long Shan, Suzhou (CN); Yabing Liu, Suzhou (CN); Yan Wang, Suzhou (CN); Junfeng Yu, Suzhou (CN); Hangsheng Wen, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 0 days.

(21) Appl. No.: 18/141,540

(22) Filed: May 1, 2023

(65) Prior Publication Data

US 2023/0268642 A1 Aug. 24, 2023

Related U.S. Application Data

(63) Continuation of application No. 17/464,802, filed on Sep. 2, 2021, now Pat. No. 11,677,141.

(30) Foreign Application Priority Data

Sep. 3, 2020 (CN) ......................... 202010917815.1
Apr. 29, 2021 (CN) ......................... 202110472134.3

(51) Int. Cl.
*H01Q 1/22* (2006.01)
*H01P 1/18* (2006.01)
(Continued)

(52) U.S. Cl.
CPC ................. *H01Q 1/36* (2013.01); *H01P 1/18* (2013.01); *H01Q 1/2283* (2013.01); *H01Q 3/30* (2013.01); *H01Q 15/14* (2013.01)

(58) Field of Classification Search
CPC .......... H01Q 1/36; H01Q 1/2283; H01Q 3/30; H01Q 15/14; H01P 1/18
(Continued)

(56) References Cited

U.S. PATENT DOCUMENTS

2002/0000897 A1* 1/2002 Huor .................. H03H 9/14538 310/313 C
2017/0358865 A1 12/2017 Sledkov et al.
(Continued)

FOREIGN PATENT DOCUMENTS

WO 2020135533 A1 7/2020

OTHER PUBLICATIONS

"Maloratsky L G: "Reviewing the Basics of Suspended Striplines", Microwave Journal, Horizon House Publications, Norwood, MA, US, vol. 45, No. 10, Oct. 1, 2002 (Oct. 1, 2002)".
(Continued)

*Primary Examiner* — Peguy Jean Pierre
(74) *Attorney, Agent, or Firm* — Myers Bigel, P.A.

(57) ABSTRACT

Base station antennas, and components for base station antennas, such as reflectors, feeder components, frames, and column components. A base station antenna may include a reflector; a first radiator located at the front side of the reflector; mutually parallel first and second ground plates extending backward from the reflector and basically perpendicular to the reflector; and a first conductor strip extending between the first and second ground plates and configured to feed power to the first radiator. The first conductor strip and the first and second ground plates may be configured as a first stripline transmission line. The reflector and the first and second ground plates may be configured as one piece so that the reflector is grounded via the first and second ground plates without soldering.

23 Claims, 31 Drawing Sheets

(51) Int. Cl.
*H01Q 1/36* (2006.01)
*H01Q 3/30* (2006.01)
*H01Q 15/14* (2006.01)

(58) Field of Classification Search
USPC .......................................................... 343/912
See application file for complete search history.

(56) References Cited

U.S. PATENT DOCUMENTS

| | | | | |
|---|---|---|---|---|
| 2018/0254544 | A1* | 9/2018 | Lee ........................ | H01Q 19/10 |
| 2019/0044243 | A1 | 2/2019 | Vollmer et al. | |
| 2020/0220252 | A1 | 7/2020 | Xiao et al. | |

OTHER PUBLICATIONS

"Notification of Transmittal of the International Search Report and the Written Opinion of the International Searching Authority, or the Declaration for corresponding International Application No. PCT/US2021/048800, mailing date: Feb. 11, 22, (27 pages)".

* cited by examiner

BASE STATION ANTENNA, FEEDER COMPONENT AND FRAME COMPONENT

CROSS-REFERENCE TO RELATED APPLICATIONS

The present application claims priority under 35 U.S.C. § 120 to, and is a continuation of, U.S. patent application Ser. No. 17/464,802, filed Sep. 2, 2021, which in turn, claims benefit of priority to Chinese Patent Application No. 202010917815.1, filed on Sep. 3, 2020, and to Chinese Patent Application No. 202110472134.3, filed on Apr. 29, 2021, and the entire contents of each above-identified application are incorporated by reference as if set forth herein.

TECHNICAL FIELD

The present disclosure relates to communication systems, and more particularly, to base station antennas, and feeder components and frame components for base station antennas.

BACKGROUND

Wireless base stations are well known in the art, and generally include baseband units, radios, antennas and other components. Antennas are configured to provide bidirectional radio frequency ("RF") communication with fixed and mobile subscribers ("users") located throughout the cell. Generally, antennas are installed on towers or raised structures such as poles, roofs, water towers, etc., and separate baseband units and radio equipment are connected to the antennas.

FIG. 1 is a schematic structural diagram of a conventional base station 60. The base station 60 includes a base station antenna 50 that can be mounted on a tower 30. The base station 60 also includes baseband units 40 and radios 42. In order to simplify the drawing, a single baseband unit 40 and a single radio device 42 are shown in FIG. 1. However, it should be understood that more than one baseband unit 40 and/or radio 42 may be provided. In addition, although the radio 42 is shown as being co-located with the baseband unit 40 at the bottom of the tower 30, it should be understood that in other cases, the radio device 42 may be a remote radio head mounted on the tower 30 adjacent to the antenna 50. The baseband unit 40 can receive data from another source, such as a backhaul network (not shown), and process the data and provide a data stream to the radio 42. The radio 42 can generate RF signals including data encoded therein and amplify and transmit these RF signals to the antenna 50 through the coaxial transmission line 44. It should also be understood that the base station 60 of FIG. 1 may generally include various other devices (not shown), such as a power supply, a backup battery, a power bus, an antenna interface signal group (AISG) controller, and the like. Generally, a base station antenna includes one or more phased arrays of radiating elements, wherein the radiating elements are arranged in one or plurality of columns when the antenna is installed for use.

In order to transmit and receive RF signals to and from the defined coverage area, the antenna beam of the antenna 50 is usually inclined at a certain downward angle with respect to the horizontal plane (called "downtilt"). In some cases, the antenna 50 may be designed so that the "electronic downtilt" of the antenna 50 can be adjusted from a remote location. With the antenna 50 including such an electronic tilt capability, the physical orientation of the antenna 50 is fixed, but the effective tilt of the antenna beam can still be adjusted electronically, for example, by controlling phase shifters that adjust the phase of signals provided to each radiating element of the antenna 50. The phase shifter and other related circuits are usually built in the antenna 50 and can be controlled from a remote location. Typically, AISG control signals are used to control the phase shifter.

Many different types of phase shifters are known in the art, including rotary wiper arm phase shifters, trombone style phase shifters, sliding dielectric phase shifters, and sliding metal phase shifters. The phase shifter is usually constructed together with the power divider as a part of the feeding network (or feeder component) for feeding the phased array. The power divider divides the RF signal input to the feed network into a plurality of sub-components, and the phase shifter applies a changeable respective phase shift to each sub-component so that each sub-component is fed to one or plurality of radiators.

SUMMARY

The present disclosure provides base station antennas and feeder components for the base station antennas.

According to a first aspect of the present disclosure, a base station antenna may be provided. The base station antenna may include: a reflector; a first radiator located at the front side of the reflector; first and second ground plates extending backward from the reflector basically perpendicular to the reflector and parallel to each other; and a first conductor strip extending on a plane between the first and second ground plates and configured to feed power to the first radiator, wherein the first conductor strip and the first and second ground plates are configured as a first stripline transmission line, wherein the reflector and the first and second ground plates are configured as one piece so that the reflector is grounded via the first and second ground plates without soldering.

According to a second aspect of the present disclosure, a base station antenna is provided, comprising: a reflector; a first radiator located at the front side of the reflector; a first cavity element located at the rear side of the reflector, wherein the first cavity element comprises first and second ground plates which are parallel to each other and extend backward from the reverse side of the reflector basically perpendicular to the reverse side of the reflector, and each of the first and second ground plates has a first edge part close to the reflector; a first conductor strip extending on a plane between the first and second ground plates and configured to feed the first radiator, wherein the first conductor strip and the first and second ground plates constitute a first stripline transmission line; and a first dielectric layer located between the first side of the first and second ground plates and the reflector, wherein the first side of the first ground plate extends laterally far away from the first conductor strip and out of a first coupling part basically parallel to the reverse surface of the reflector; a first edge part of the second ground plate extends laterally far away from the first conductor strip and out of a second coupling part basically parallel to the reverse surface of the reflector; and the first and second coupling parts are each electrically coupled to the reflector via the first dielectric layer, so that the reflector is grounded via the first cavity element without soldering.

According to a third aspect of the present disclosure, a feeder component is provided, which is used for columns of radiators for feeding a base station antenna, wherein the feeder component includes a stripline transmission line located at the rear side of a reflector and basically perpendicular to the reflector, the stripline transmission line includes first and second ground plates parallel to each other, and a conductor strip extending on a plane between the first and second ground plates, the conductor strip has an input part and a plurality of output parts, wherein the first and second ground plates are electrically connected to an outer conductor of a coaxial transmission line for feeding the column, the input part is electrically connected to an inner conductor of the coaxial transmission line, the plurality of output parts are configured to be electrically connected to the column to feed the column, and the first and second ground plates are constructed as one piece with the reflector so that the reflector is grounded via the first and second ground plates without soldering.

According to a fourth aspect of the present disclosure, a frame for a base station antenna is provided, comprising: a first planar element extending along a first plane, wherein the surface of a first side of the first planar element is configured to reflect electromagnetic radiation of the base station antenna; and mutually parallel second and third planar elements extending basically perpendicularly from the first planar element to a second side of the first planar element, wherein the second and third planar elements are configured to define a first chamber for a first conductor strip, wherein the first to third planar elements are constructed as one piece so as to be commonly grounded.

Other features and advantages of the present disclosure will be made clear by the following detailed description of exemplary embodiments of the present disclosure with reference to the accompanying drawings.

BRIEF DESCRIPTION OF THE FIGURES

The accompanying drawings, which form a part of the specification, describe embodiments of the present disclosure and, together with the description, are used to explain the principles of the present disclosure.

FIGS. 3A to 3E show a base station antenna according to an embodiment of the present disclosure, wherein FIG. 3A is a front view of the antenna, FIG. 3B is a rear view of the antenna, FIG. 3C is a bottom view of the antenna, and FIGS. 3D and 3E are perspective front and back views of the antenna, respectively.

Figure 1:
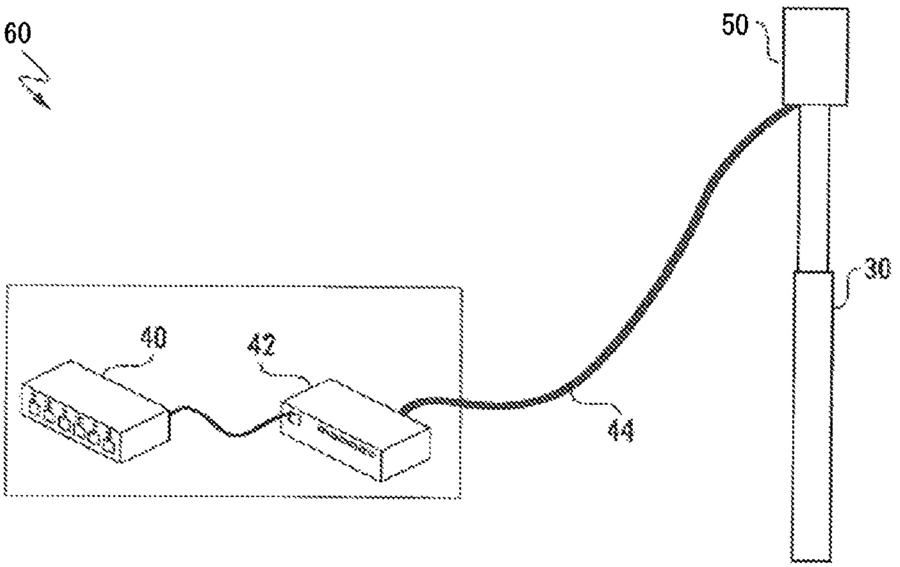
FIG. 1 is a schematic structural diagram of a conventional base station.

Note, in the embodiments described below, the same signs are sometimes used in common between different drawings to denote the same parts or parts with the same functions, and repeated descriptions thereof are omitted. In some cases, similar labels and letters are used to indicate similar items. Therefore, once an item is defined in one figure, it does not need to be further discussed in subsequent figures.

For ease of understanding, the position, dimension, and range of each structure shown in the attached drawings and the like may not indicate the actual position, dimension, and range. Therefore, the present disclosure is not limited to the position, size, range, etc. disclosed in the attached drawings.

DETAILED DESCRIPTION

The present disclosure will be described below with reference to the attached drawings, which show several embodiments of the present disclosure. However, it should be understood that the present disclosure can be presented in many different ways and is not limited to the embodiments described below. In fact, the embodiments described below are intended to make the present disclosure more complete and to fully explain the protection scope of the present disclosure to those skilled in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be “on” another element, “attached” to another element, “connected” to another element, “coupled” to another element, or “in contact with” another element, etc., the element may be directly on another element, attached to another element, connected to another element, coupled to another element, or in contact with another element, or an intermediate element may be present. In contrast, if an element is described “directly” “on” another element, “directly attached” to another element, “directly connected” to another element, “directly coupled” to another element or “directly in contact with” another element, there will be no intermediate elements. As used herein, when one feature is arranged “adjacent” to another feature, it may mean that one feature has a part overlapping with the adjacent feature or a part located above or below the adjacent feature.

In this specification, elements, nodes or features that are “coupled” together may be mentioned. Unless explicitly stated otherwise, “coupled” means that one element/node/feature can be mechanically, electrically, logically or otherwise connected with another element/node/feature in a direct or indirect manner to allow interaction, even though the two features may not be directly connected. That is, “coupled” is intended to comprise direct and indirect connection of components or other features, including connection using one or a plurality of intermediate components.

As used herein, spatial relationship terms such as “upper,” “lower,” “left,” “right,” “front,” “back,” “high” and “low” can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being “below” other features now can be described as being “above” the other features. The device may also be oriented by other means (rotated by 90 degrees or at other locations), and at this time, a relative spatial relation will be explained accordingly.

As used herein, the term “A or B” comprises “A and B” and “A or B,” not exclusively “A” or “B,” unless otherwise specified.

As used herein, the term “exemplary” means “serving as an example, instance or explanation,” not as a “model” to be accurately copied. Any realization method described exemplarily herein is not necessarily interpreted as being preferable or advantageous over other realization methods. Furthermore, the present disclosure is not limited by any expressed or implied theory given in the above technical field, background art, summary, or embodiments.

As used herein, the term “basically” or “substantially” is intended to include any minor changes caused by design or manufacturing defects, device or component tolerances, environmental influences, and/or other factors. The term “basically” or “substantially” is also intended to encompass the gap from the perfect or ideal situation due to parasitic effects, noise, and other practical considerations that may be present in the actual implementation.

In addition, for reference purposes only, "first," "second" and similar terms may also be used herein, and thus are not intended to be limitative. For example, unless the context clearly indicates, the words "first," "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Figure 2A:
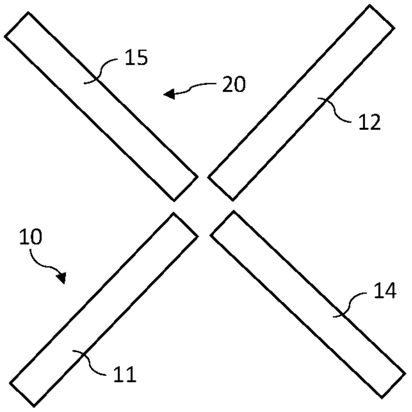
FIGS. 2A and 2B are schematic diagrams for explaining radiators and radiating elements of the present disclosure.
Figure 2B:
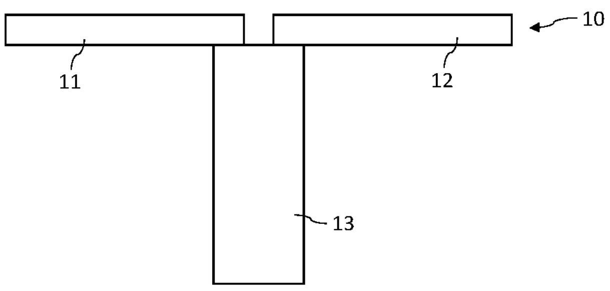

With reference to FIGS. 2A and 2B, as used herein, unless otherwise specified, "radiator" refers to a radiator including one or more radiating arms, such as dipole radiator 10 including radiating arms 11 and 12 shown in FIG. 2B. Unless otherwise specified, "radiating element" refers to a radiating element including the radiator 10 and its supporting/feeding element 13. The "dual-polarized radiating element" mentioned herein includes two radiating elements arranged orthogonally to each other, which may be, for example, a cross dipole radiating element shown in FIG. 2A, which includes a radiator 10 and a radiator 20 (which include radiating arms 14 and 15) arranged crosswise.

FIGS. 3A to 3E show a base station antenna 100 according to an embodiment of the present disclosure. FIG. 3F is a bottom view of the frame 110 in the antenna 100. FIG. 4A is an enlarged bottom view of a cavity component of the frame 110. FIG. 4B is an enlarged bottom view of the cavity component.

A plurality of dual-polarized radiating elements 121, 131, 141, 151 and 161 are installed to extend forwardly from the front surface of the reflector 113. The radiating elements include low-band radiating elements 121, middle-band radiating elements 131 and 141, and high-band radiating elements 151 and 161. The low-band radiating elements 121 are installed in two columns to form two linear arrays 120-1, 120-2 of low-band radiating elements 121. The mid-band radiating elements 131 are installed in two columns to form two linear arrays 130-1, 130-2 of mid-band radiating elements 131. The mid-band radiating elements 141 are installed in two columns to form two linear arrays 140-1, 140-2 of mid-band radiating elements 141. The linear arrays 130-1 and 140-1 are adjacent each other. The arrays 130-1 and 140-1, taken together, can extend basically the entire length of the antenna 100. The linear arrays 130-2 and 140-2 are adjacent each other. The arrays 130-2 and 140-2, taken together, can also extend basically the entire length of the antenna 100. The high-band radiating elements 151 are installed in four columns to form an array 150 of high-band radiating elements 151. The high-band radiating elements 161 are installed in four columns to form an array 160 of high-band radiating elements 161. Array 150 may stacked above array 160. It should be noted that similar elements may be individually referred to by their complete drawing reference numerals (e.g., linear array 120-1) or collectively referred to by the first part of their drawing reference numerals (e.g., linear array 120).

In some embodiments, the numbers of low-band, middle-band and/or high-band radiating elements and their linear arrays may be different from the numbers shown in FIGS. 3A to 3E. In the depicted embodiment, the array 150 of high-band radiating elements 151 and the array 160 of high-band radiating elements 161 are positioned between the linear arrays 120-1, 120-2 of low-band radiating elements 121, and each linear array 120 of low-band radiating elements 121 is positioned between a corresponding one of the arrays 150, 160 of high-band radiating elements 151, 161 and a corresponding one of the linear arrays 130, 140 of the mid-band radiating elements 131, 141. The linear array 120 of low-band radiating elements 121 may or may not extend along the entire length of the antenna 100, and the arrays 150, 160 of high-band radiating elements 151, 161 may or may not extend along the entire length of the antenna 100.

Each of radiation elements 121, 131, 141, 151, 161 may be mounted on feed board printed circuit boards 51, as best seen in FIG. 4B. The feed board printed circuits boards 51 may also be referred to herein as feed plates 51. The feed plates 51 couple RF signals to and from the individual radiating elements 121, 131, 141, 151, 161. One or a plurality of radiating elements 121, 131, 141, 151, 161 may be mounted on each of the feed plates 51.

The frame 110 includes a reflector 113 and a plurality of cavity components 111 extending rearward from the reflector 113. The cavity components extend perpendicular to the reflector 113. Each cavity component 111 provides at least one chamber 24 for accommodating a conductor strip component 310. Each cavity component 111 may extend basically the entire length of the reflector 113 in the longitudinal direction. The frame 110 may be constructed as an integral piece of metal (e.g., aluminum), and may be integrally formed by a pultrusion process, so that the reflector 113 and the cavity component 111 are grounded together, enabling the reflector 113 to provide a ground plane for the radiating elements 121, 131, 141, 151, and 161. The frame 110 is constructed as an integral piece, so that the reflector 113 can be grounded via the cavity component 111 without soldering, which may improve, and may significantly improve, the passive intermodulation (PIM) performance of the base station antenna.

The structure of each cavity component 111 is shown in FIGS. 4A and 4B. The cavity component includes a planar element 21. The planar element 21 may be implemented as a part of the reflector 113 in the embodiments in FIGS. 3A to 3F and as a part of the reflector 211 in the embodiments shown in FIGS. 5A to 5D, such the planar element 21 may be referred to herein as "reflector 21". The mutually parallel planar elements 22-1 and 22-2 (hereinafter referred to as "ground plates" because the planar elements are grounded) extend from the planar element 21 basically perpendicularly to the rear side of the planar element 21 to define side walls of a chamber 24-1 for accommodating the conductor strip component 310-1. A second pair of mutually parallel ground plates 22-3 and 22-4 extend from the planar element 21 basically perpendicularly to the rear side of the planar element 21 to define side walls of a chamber 24-2 for accommodating the conductor strip component 310-2. The conductor strip component 310-1 may be used to feed the first polarized radiators of the dual-polarized radiating elements of a linear array, and the conductor strip component 310-2 may be used to feed the second polarized radiators of the dual-polarized radiating elements of the linear array. The ground plates 22 may be arranged such that the chambers 24-1 and 24-2 are closely adjacent, and the ground plates 22-2 and 22-4 may be the same planar element. The cavity component 111 further comprises planar elements 23-1 and 23-2 (hereinafter referred to as "partition plates" because the planar elements isolate the chamber 24 from the outside) which are located on the rear side of the planar element 21 and are basically parallel to the planar element 21. The partition plate 23-1 is connected to the rear edges of the ground plates 22-1 and 22-2, so that the chamber 24-1 is closed. The partition plate 23-2 is connected to the rear edges of the ground plates 22-3 and 22-4, so that the chamber 24-2 is also closed. As the ground plates 22-2 and 22-4 are implemented as a single planar element, the partition plates 23-1 and 23-2 can be connected to each other at the ground plates 22-2 and 22-4. The planar element 21, the ground plates 22, and the partition plates 23 are constructed as an integral piece. For example, they are integrally formed by a pultrusion process based on metal materials, so that the planar element 21, the ground plates 22, and the partition plates 23 are grounded together without welding.

Figure 6A:
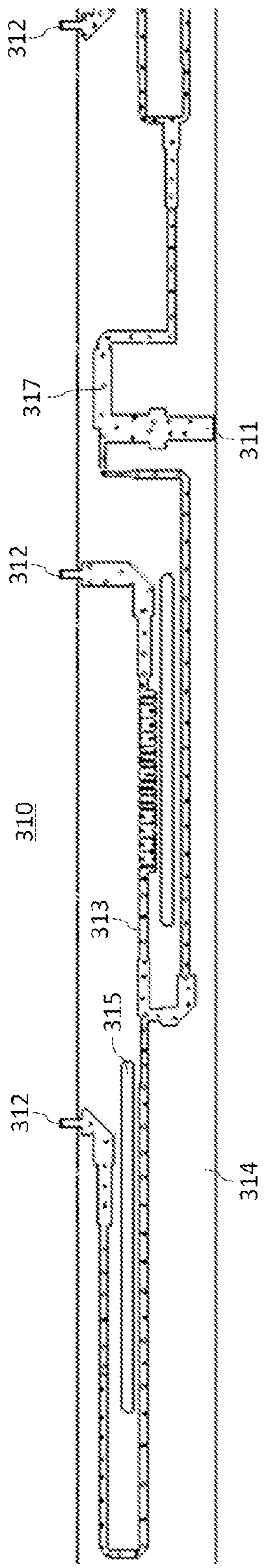
FIG. 6A is a side view of a part of a conductor strip component in a base station antenna according to an embodiment of the present disclosure.
Figure 6B:
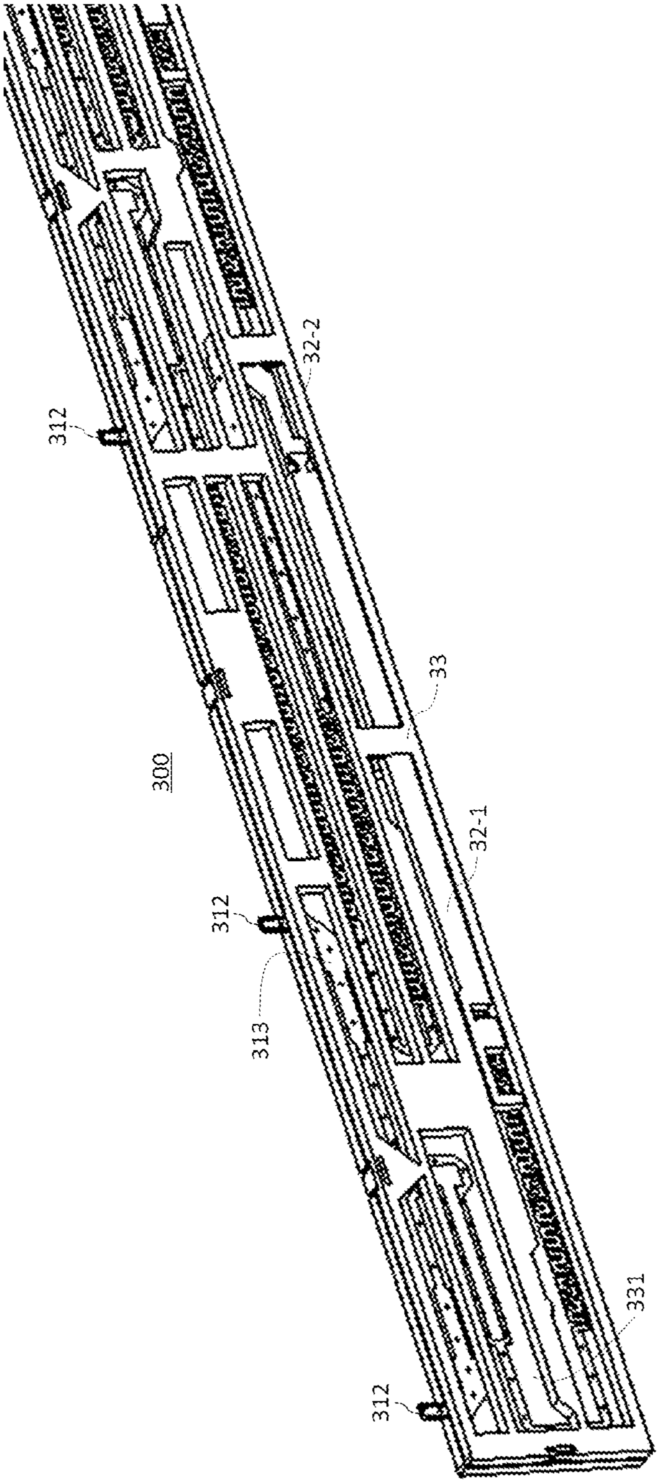
FIG. 6B is a perspective view of a part of a content component placed in the chamber of the base station antenna according to an embodiment of the present disclosure.

FIG. 6A is a schematic diagram of a conductor strip component 310 of the base station antenna according to an embodiment of the present disclosure. FIG. 6B is a perspective view of a content component 300 placed in the chamber in the base station antenna according to an embodiment of the present disclosure. The conductor strip component 310 includes a conductor strip 313. The conductor strip 313 has an input part 311 and a plurality of output parts 312. It should be noted that the component 311 is called "input part" and the components 312 are called "output parts," which describes the situation when the base station antenna is transmitting RF signals. It should be understood that when the base station antenna receives RF signals, the components 312 will operate as "inputs" and the component 311 will operate as an "output" due to the reversal of the traveling direction of the RF signal. The input part 311 may be electrically connected to the inner conductor of a coaxial transmission line (as will be described below with reference to FIGS. 9A to 9E), and the output parts 312 may be electrically connected to the radiators in a corresponding radiating element (for example, via transmission lines on the feed plates).

The conductor strip 313 in the conductor strip component 310 extends between the adjacent ground plates 22, so that the conductor strip 313 and the ground plates 22 located on both sides of the conductor strip 313 form a stripline transmission line to feed the radiators. Because the conductor strip 313 is within the cavity component 111, the energy radiated by the RF signals transmitted on the conductor strip 313 to the outside of the cavity component 111 can be reduced, and the radiation interference from the outside of the cavity component 111 can also be reduced. In the conductor strip component 310 shown in FIG. 6A, the conductor strip 313 is a conductor circuit printed on a dielectric substrate 314. It should be understood that in other embodiments, the conductor strip 313 may be realized by sheet metal. For example, the conductor strip component 310 may not include the dielectric substrate 314, but only include the conductor strip 313. When the conductor strip 313 is formed of conductor lines printed on the dielectric substrate 314, in order to reduce losses caused by the dielectric substrate 314 (for example, when the dielectric substrate 314 is thick), the conductor strip 313 may include first and second lines printed on opposite first and second surfaces of the dielectric substrate 314 (for example, the first surface of the dielectric substrate 314 and the first circuit printed on the first surface are visible in FIG. 6A), and the projection of the first circuit on the dielectric substrate 314 completely coincides with that of the second circuit on the dielectric substrate, that is, the first and second circuits are symmetrical about the plane where the dielectric substrate 314 lies. The first line and the second line are electrically connected through conductive through holes 317 (e.g., a plated through hole (PTH)) passing through the dielectric substrate 314.

The conductor strip 313 may provide power dividers (power combiners in the receiving path of the antenna) from the input part 311 to the plurality of output parts 312, and these power dividers may be used to divide the RF signal input at the input part 311 into a plurality of sub-components that are output through the respective output parts 312. In addition, in the content component 300 shown in FIG. 6B, a moving element 32 that can move relative to the conductor strip 313 is further included. By movement of the moving element 32 relative to the conductor strip 313, the relative phase shift applied to the corresponding sub-components of the RF signal output through the corresponding output part 312 of the conductor strip 313 can be adjusted. In the described embodiment, the moving element 32 is a dielectric element slidable relative to the conductor strip 313, and the relative phase shift is adjusted by changing the coverage area or length of the moving element 32 on different parts of the conductor strip 313, so that the content component 300 is formed as a sliding dielectric phase shifter integrated with the power divider. Nevertheless, it should be understood that in other embodiments, the moving element 32 may be a slider rotatable with respect to the conductor strip 313, a trombone transmission line slidable with respect to the conductor strip 313, or a metal slidable with respect to the conductor strip 313, so that the content components 300 form a rotating slide arm phase shifter, a trombone type phase shifter or a sliding metal phase shifter integrated with the power distributor, respectively.

Figure 9A:
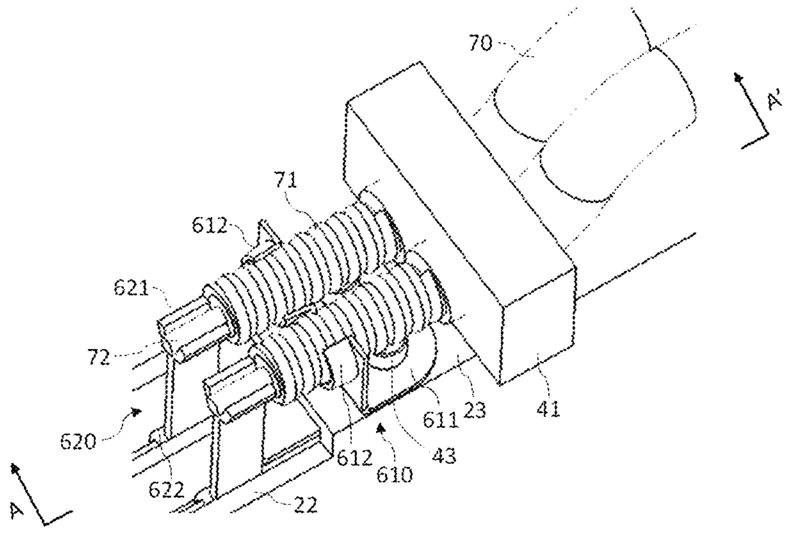
FIG. 9A is a perspective view of the transition between coaxial transmission line and stripline transmission line in the base station antenna according to an embodiment of the present disclosure.
Figure 9B:
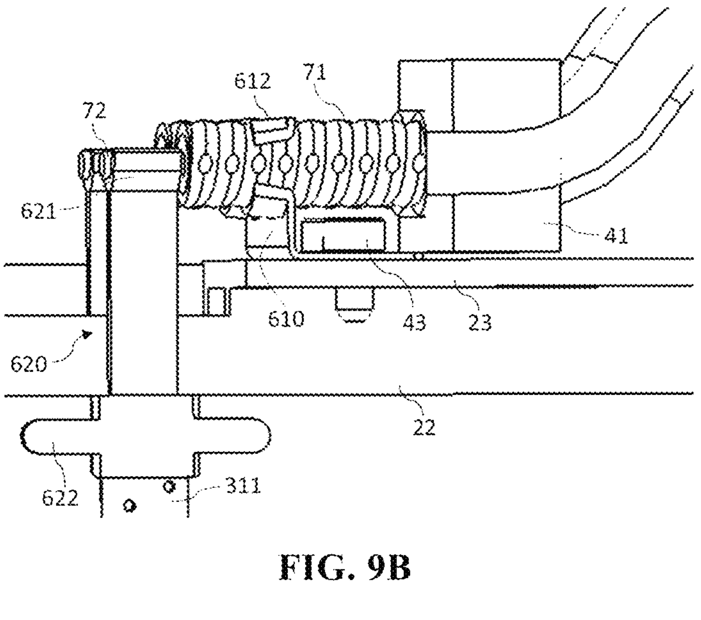
FIG. 9B is a sectional view along the direction A-A' in FIG. 9A.
Figure 9C:
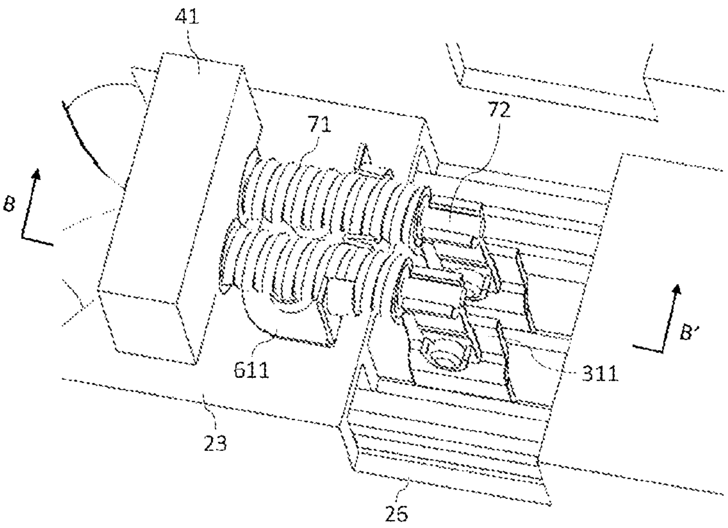
FIG. 9C is a perspective view of the transition between the coaxial transmission line and the stripline transmission line in the base station antenna according to another embodiment of the present disclosure.
Figure 9D:
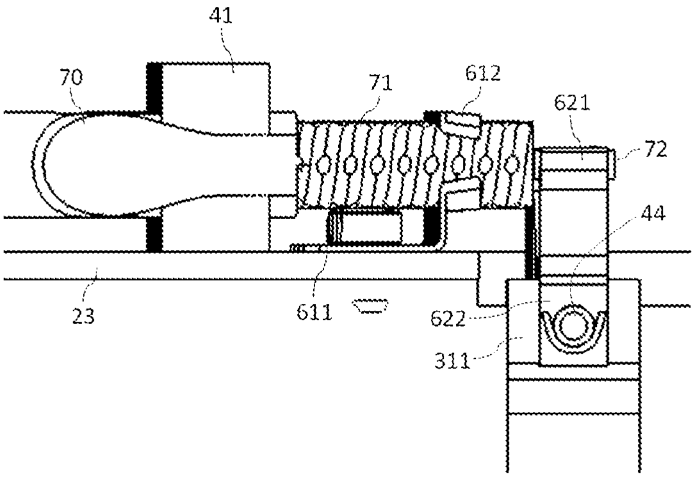
FIG. 9D is a sectional view along the direction B-B' in FIG. 9A.
Figure 9E:
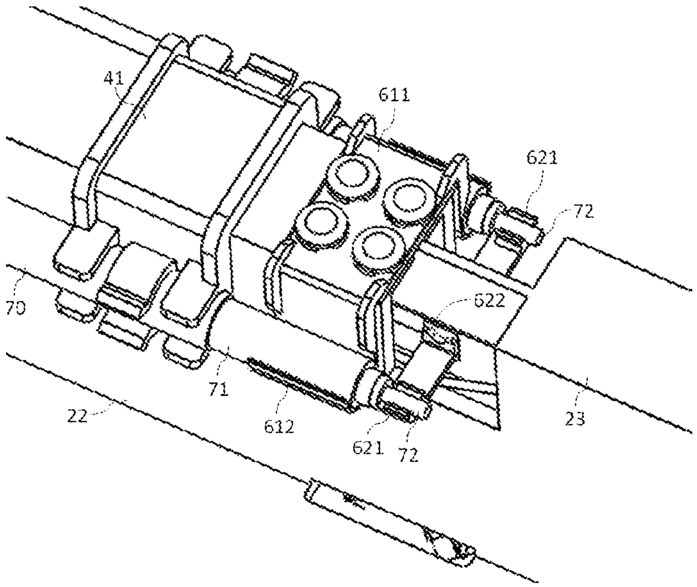
FIG. 9E is a perspective view of the transition between the coaxial transmission line and the stripline transmission line in the base station antenna according to an embodiment of the present disclosure.
Figure 9F:
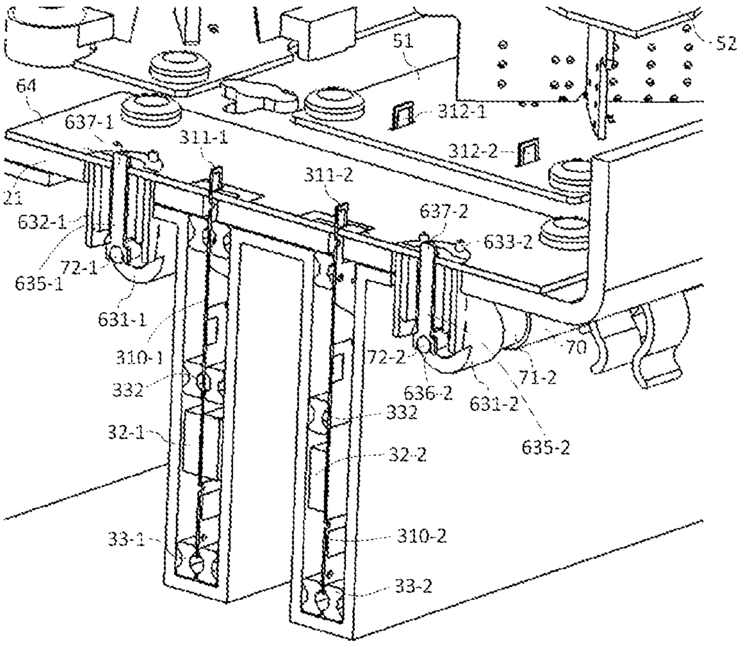
FIG. 9F is a sectional view of the transition between the coaxial transmission line and the stripline transmission line in the base station antenna according to an embodiment of the present disclosure.
Figure 13A:
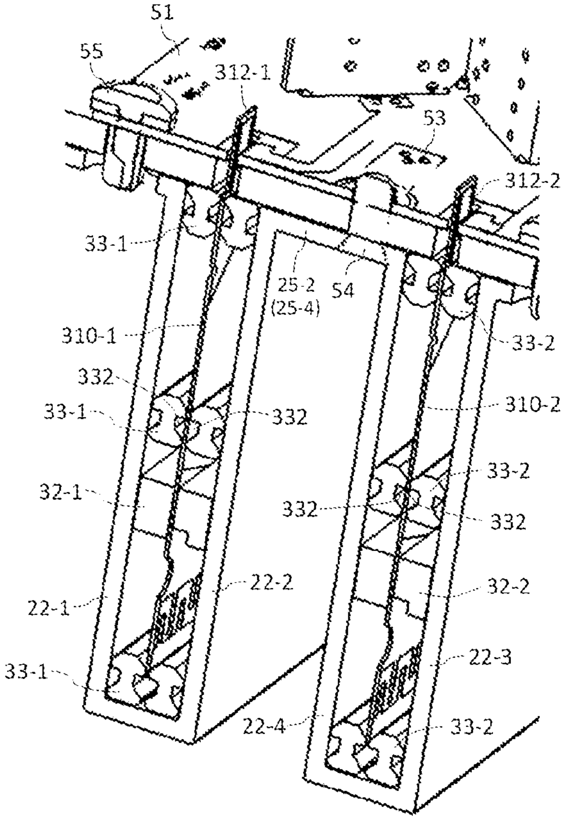
FIGS. 13A and 13B are respectively a stereo sectional view of the cavity element and a perspective view of the feed plate in the base station antenna according to an embodiment of the present disclosure.

The content component 300 further comprises a holder 33 made of a dielectric material and positioned between the conductor strip component 310 and the ground plates 22, which is used to hold the conductor strip 313 approximately in the middle of two adjacent ground plates 22, especially when the conductor strip 313 is thin, flexible, and/or soft. In the stripline transmission line, the higher the dielectric constant between the conductor strip and the ground plate, the lower the speed of the RF signal transmitted on the conductor strip. Therefore, the holder 33 may be designed to cover only a small portion of the conductor strip 313, so that the dielectric between the conductor strip 313 and the ground plate 22 is mostly air, which has a low dielectric constant. As shown in FIG. 6B, an opening 331 is formed in the holder 33 to reduce the covering area of the conductor strip 313 by the holder 33. In some embodiments, the extent to which the holder 33 covers the conductor strip 313 is, for example, less than 10% of the area of the conductor strip 313. In addition, the holder 33 may only be positioned between the dielectric substrate 314 and the ground plate 22, so that the holder 33 basically does not cover the conductor strip 313. In addition, in some embodiments, as shown in FIGS. 9F and 13A, the surface of the holder 33 close to the conductor strip component 310 and/or close to the ground plate 22 may have an indented part 332 so that the holder 33 has a reduced thickness (the thickness of the holder 33 refers to the dimension of the holder 33 in the direction from the conductor strip component 310 to the corresponding ground plate 22), so that the dielectric constant between the conductor strip 313 and the corresponding ground plate 22 can be reduced. Since a moving element 32 covering the conductor strip 313 and moving relative to the conductor strip 313 is also provided between the conductor strip 313 and the holder 33, a yielding structure (not shown) is provided at the corresponding position of the holder 33 to facilitate the placement and movement of the moving element 32.

In the embodiment described in FIGS. 3A to 3F, the frame 110 includes cavity components 111-1 to 111-8. Each cavity component 111 contains two content components 300, with one used to feed the first polarized radiators of a linear array and the other used to feed the second polarized radiators of the linear array. Cavity component 111-1 is used for linear arrays 130-1 and 140-1, and the conductor strip component feeding linear array 130-1 is arranged in the upper part of the cavity component 111-1 and the conductor strip component feeding linear array 140-1 is arranged in the lower part of cavity component 111-1. Cavity components 111-2 and 111-7 are used for linear arrays 120-1 and 120-2, respectively, and the corresponding conductor strip components for feeding linear arrays 120-1 and 120-2 are arranged in the cavity components 111-2 and 111-7, respectively. Cavity components 111-3 to 111-6 are used for arrays 150 and 160, the corresponding conductor strip components for feeding linear arrays in the array 150 are respectively arranged in the upper parts of the corresponding cavity components 111-3 to 111-6, and the corresponding conductor strip components for feeding linear arrays in the array 160 are respectively arranged in the lower parts of corresponding cavity components 111-3 to 111-6. Cavity component 111-8 is used for linear arrays 130-2 and 140-2, the conductor strip component for feeding linear array 130-2 is installed in the upper part of the cavity component 111-8, and the conductor strip component for feeding linear array 140-2 is installed in the lower part of the cavity component 111-8. It can be seen that the dimensions (especially the transverse width) of the cavity components 111 for the linear arrays of radiating elements in different frequency bands are the same, that is, the distance between the two grounding plates 22 of each chamber 24 is the same, which is beneficial to the manufacture of the frame 110 and the cavity components 212 described below. The stripline transmission lines feeding the linear arrays of radiating elements of different frequency bands may have the same thickness, but their impedance characteristics can be adjusted by changing the line width of the conductor strip 313, so as to facilitate transmitting the RF signals in the frequency band in which the radiating elements fed by the stripline transmission lines work.

Figure 3A:
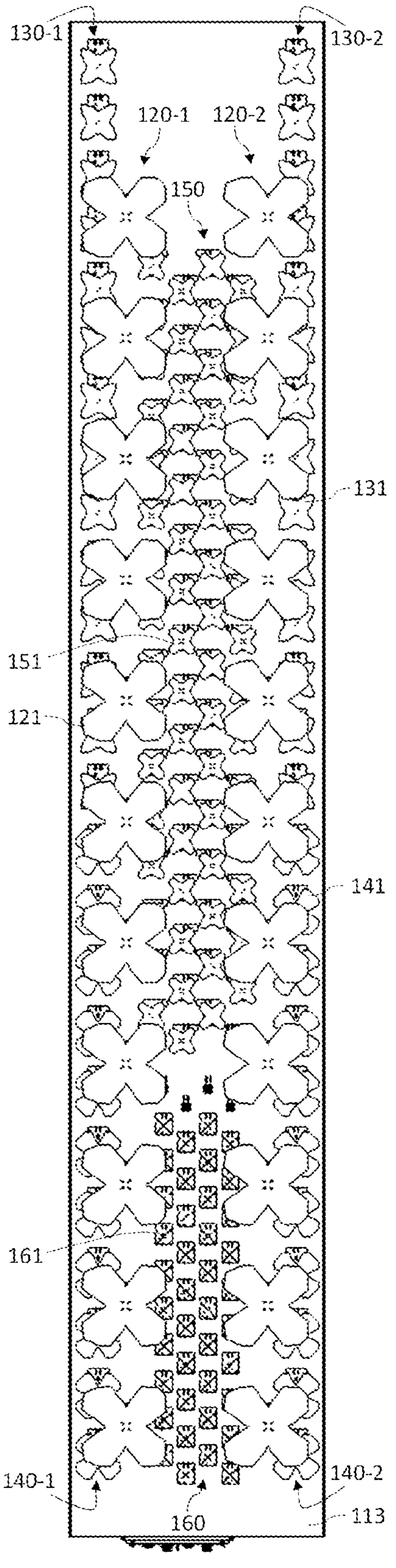
Figure 3B:
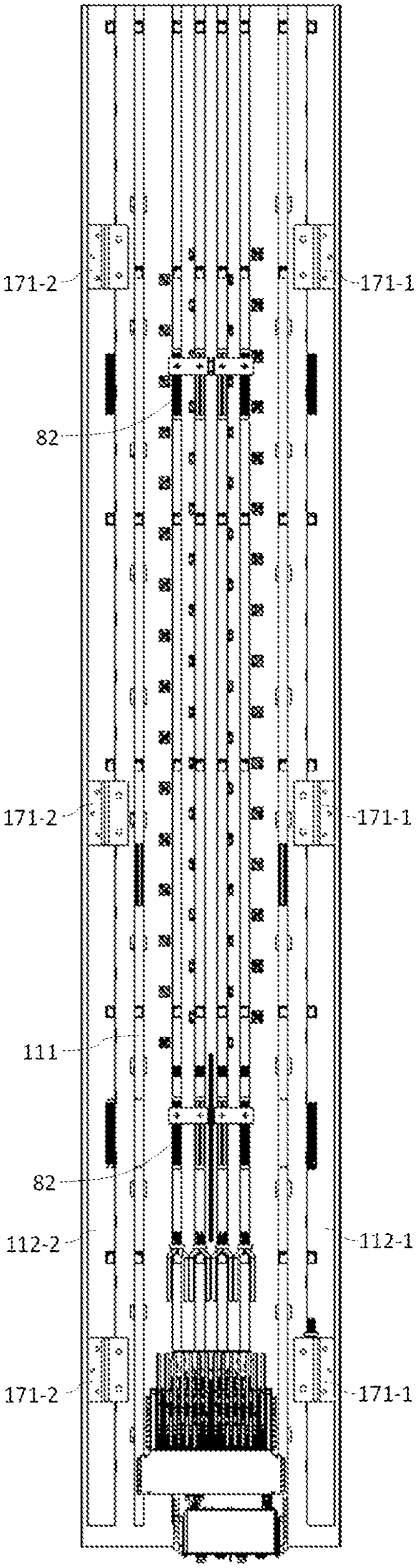
Figure 3C:
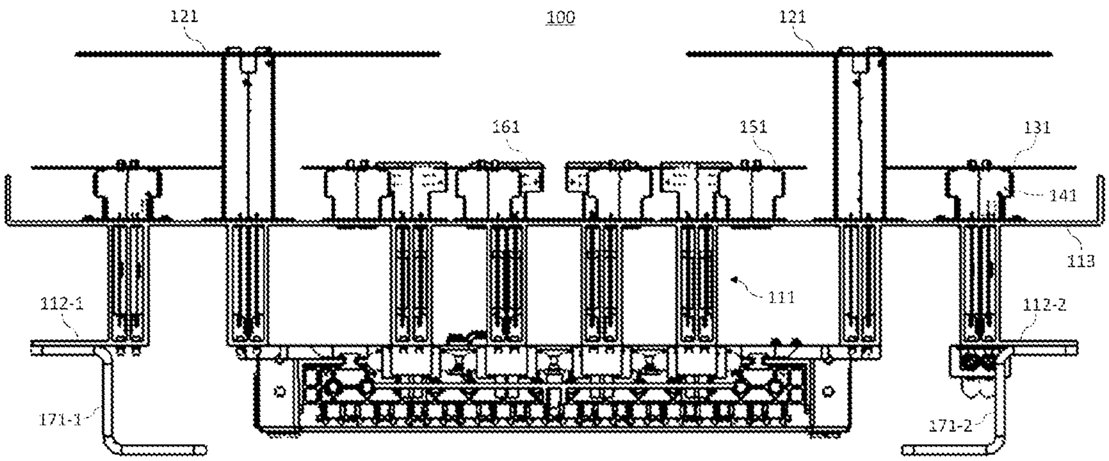
Figure 3D:
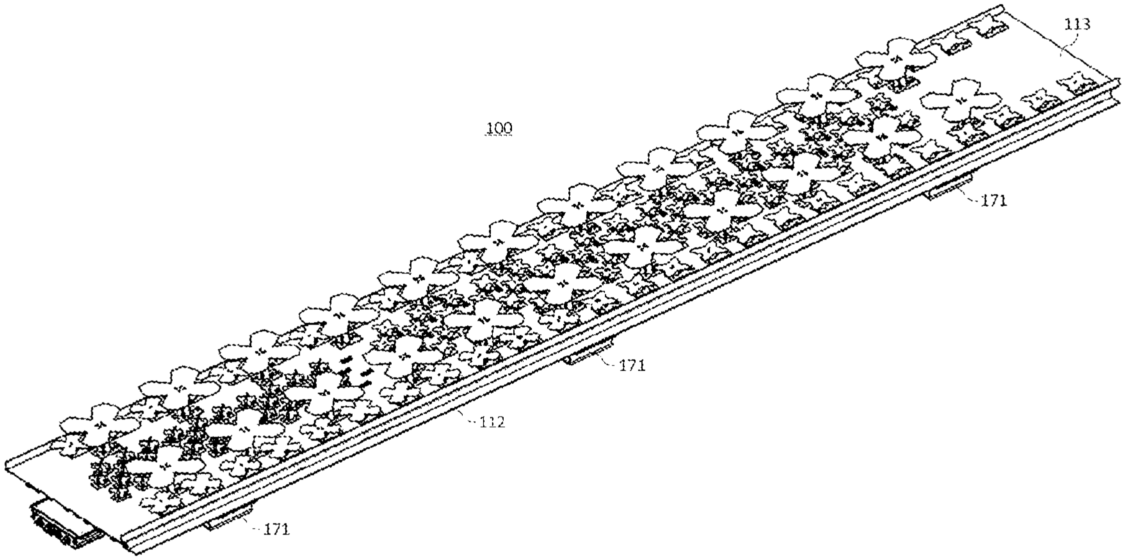
Figure 3E:
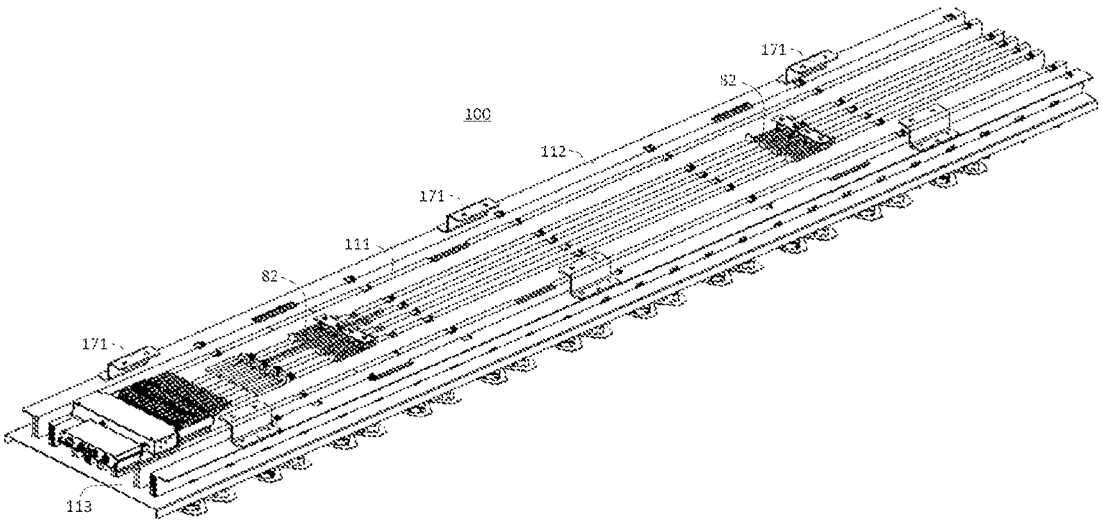
Figure 3F:
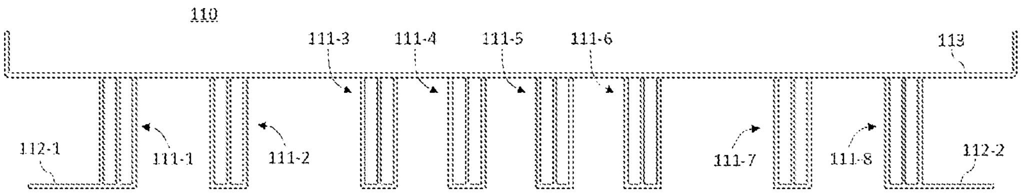
FIG. 3F is a bottom view of the frame in the antenna of FIGS. 3A to 3E.
Figure 4A:
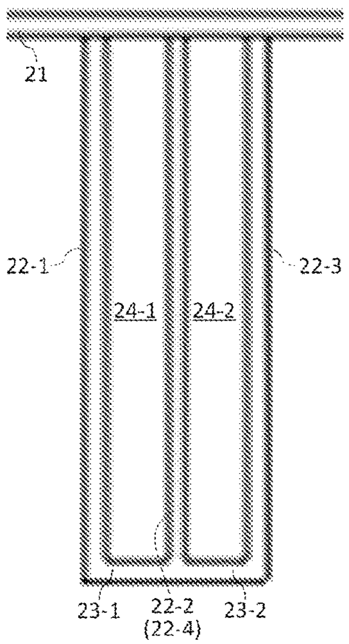
FIG. 4A is an enlarged view of a cavity component of the frame of FIG. 3F.
Figure 4B:
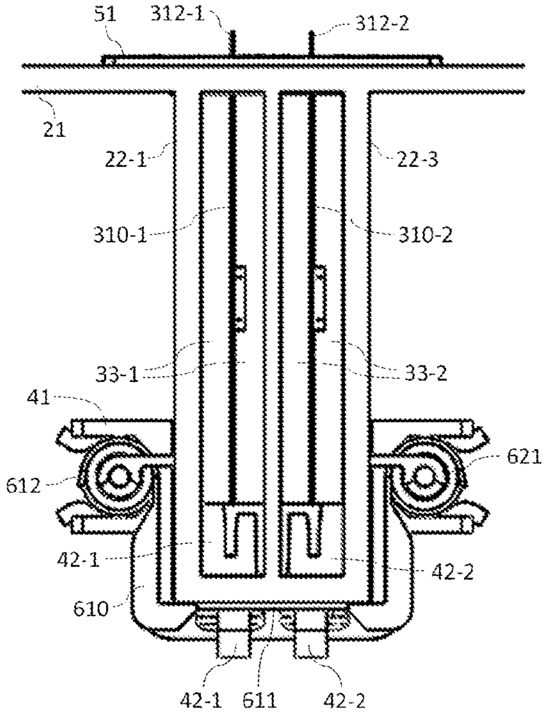
FIG. 4B is an enlarged view of a cavity component of the antenna of FIG. 3C.

As shown in FIGS. 3C and 3F, the partition plates 23 of the cavity components 111-1 and 111-2 located at both sides of the frame 110 may have extensions 112-1 and 112-2 respectively extending beyond the ground plate 22 toward both sides of the frame 110 to connect to respective mounting brackets 171-1 and 171-2 for mounting the base station antenna.

Figure 8A:
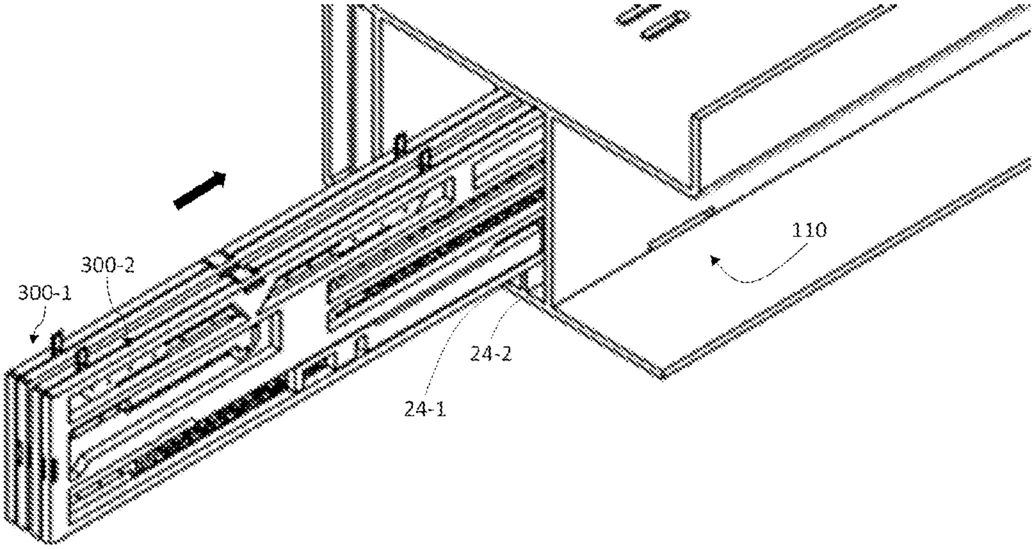
FIG. 8A is a schematic diagram showing the content component loaded into the chamber according to an embodiment of the present disclosure.
Figure 8B:
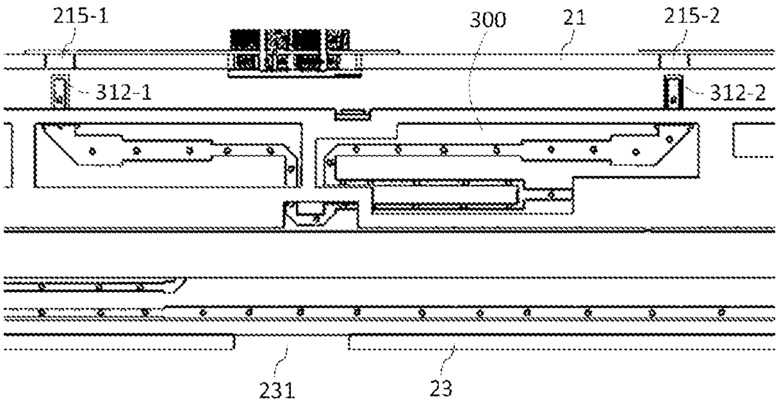
FIG. 8B is a schematic diagram of the content component shown in FIG. 8A after being loaded into the chamber.
Figure 8C:
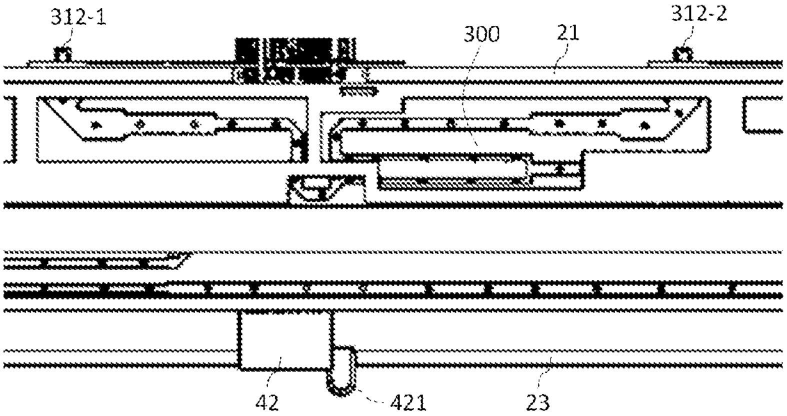
FIG. 8C is a schematic diagram of the content component shown in FIG. 8A after being loaded into the chamber and then loaded into the support.

Next, with reference to FIGS. 8A to 8C, how the content component 300 is loaded into the frame 110 will be described. In the frame 110 shown in FIGS. 3A to 3F, the openings of the chamber 24 for loading the content component 300 face the bottom and top of the frame 110, so the content component 300 needs to be loaded into the chamber 24 from the bottom or top of the component 110, as shown by the arrow in FIG. 8A. For example, the content component 300 for feeding linear array 120-1 can be loaded into the chamber 24 from the bottom or top of the chamber component 111-2, the content component 300 for feeding linear array 130-1 can be loaded from the top of the chamber component 111-1, and the content assembly 300 for feeding linear array 140-1 can be loaded from the bottom of the cavity component 111-1. A side view of the content component 300 after being loaded into the chamber 24 is shown in FIG. 8B. Since the output parts 312 need to extend from the cavity component 111 to the front of the planar element 21 (i.e., reflector) to connect to circuit elements located at the front side of the planar element 21 after the installation, the output parts 312 of the content component 300 should, after the content component 300 is put in place, be aligned with corresponding openings 215 on the planar element 21. For example, in FIG. 8B, the output part 312-1 is aligned with the opening 215-1 and the output part 312-2 is aligned with the opening 215-2. In addition, a supporting element 42 is provided to push the content component 300 forward (upward in the direction shown in FIG. 8C). As shown in FIG. 8C, the partition plate 23 is provided with an opening 231, and the support element 42 with a buckle 421 extends into the chamber 24 from the outside of the chamber component 111 via the opening 231 and is fixedly mounted to the partition plate 23 through the buckle 421, so that the support element 42 can force the content component 300 forwardly, making it convenient for the output parts 312 to extend forward from the opening 215 of the cavity component 111.

Figure 6C:
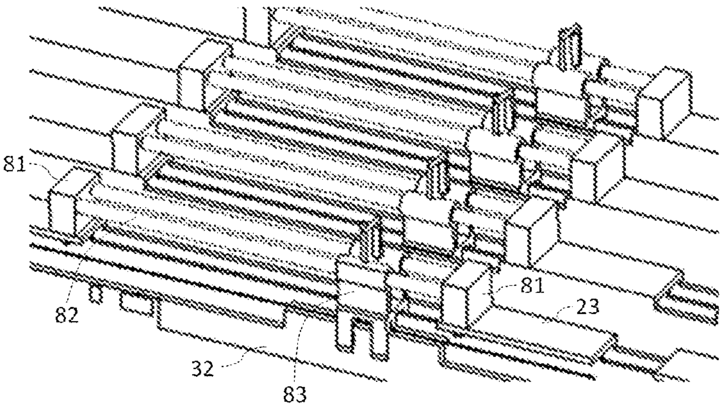
FIG. 6C is a perspective view of a driving mechanism of the content component of FIG. 6B as viewed from the back of the antenna.

Next, with reference to FIG. 6C, the realization of the movement of the moving element 32 in the content component 300 shown in FIG. 6B will be explained. As shown in the figure, the outer surface of the partition plate 23 is provided with a support 81 for supporting a slide rail 82, and the slide rail 82 is provided with a slider 83 that can slide on the slide rail. The slider 83 is fixedly connected to the moving element 32 to drive the moving element 32 to slide. As shown in FIG. 6B, when the length of the conductor strip 313 extending along the length direction (that is, "the longitudinal direction") of the base station antenna is long, it may include a plurality of moving elements 32, such as moving elements 32-1 and 32-2 mechanically connected with each other. The slider 83 only needs to be fixedly connected with one of the moving elements 32 to drive all the moving elements 32 to slide synchronously. In addition, in the case that the first and second lines symmetrical about the plane of the dielectric substrate 314 are printed on the first and second surfaces of the dielectric substrate 314 as described above, the moving elements 32 need to be arranged for both the first and second lines, and the moving elements 32 for the first and second lines are also symmetrical about the plane of the dielectric substrate 314. The moving element 32 for the first line and the moving element 32 for the second line can be mechanically connected to each other via the through hole 315 formed in the dielectric substrate 314, so as to slide synchronously under the driving of the slider 83.

Figure 12A:
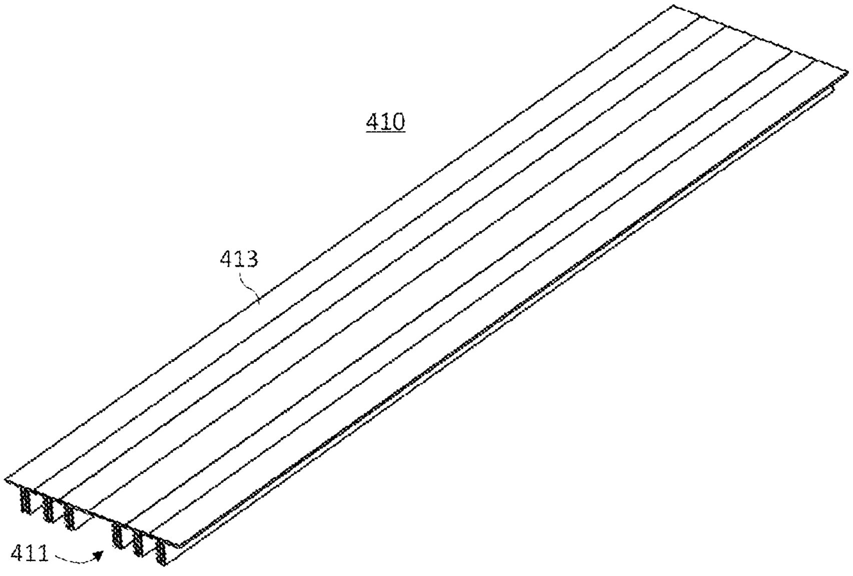
FIG. 12A is a perspective view of at least part of a frame in the base station antenna according to an embodiment of the present disclosure.
Figure 12B:
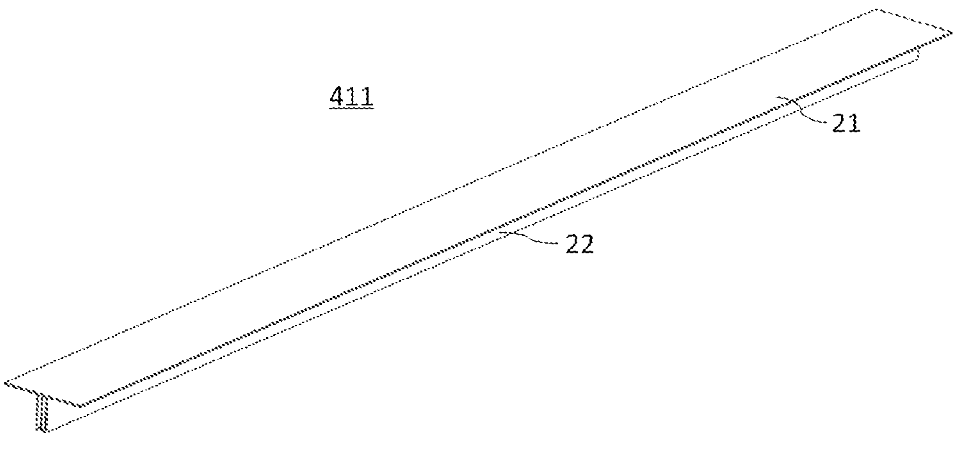
FIG. 12B is a perspective view of the cavity element in FIG. 12A.
Figure 12C:
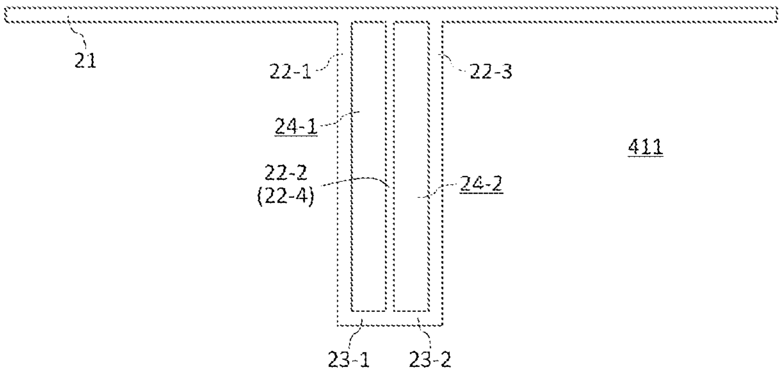
FIG. 12C is a bottom view of the cavity element of FIG. 12B.

FIG. 12A is a perspective view of at least part of a frame 410 in the base station antenna according to another embodiment of the present disclosure. FIGS. 12B and 12C show the cavity element 411 in the frame 410. As shown in the figure, the cavity element 411 has basically the same structure as the cavity component 111, including a planar element 21 and planar elements 22 and 23 that form a cavity. The frame 410 includes a plurality of laterally adjacent cavity elements 411, and each cavity element 411 can be used for an array of cross polarized radiating elements. In the depicted embodiment, adjacent cavity elements 411 are connected to each other (including electrical connection and mechanical connection) by friction stir welding process, that is, the planar element 21 of each cavity element 411 and the planar element 21 of adjacent cavity element 411 are connected together along their length by a friction stir welding process, so that a plurality of planar elements 21 of a plurality of planar cavity elements 411 are connected to form a reflector 413. The reflector 413 formed by friction stir welding has similar performance to the reflector formed integrally (for example, the reflector 113). Therefore, in this embodiment, it is not necessary to integrally form the entire frame 410 in the manufacture of the frame 410, but only to integrally form each single cavity element 411, which reduces the requirements for the integrated molding process, and contributes to reducing the cost and improving the success rate. In addition, such a frame 410 is more flexible and can easily adapt to antenna platforms with different numbers of linear arrays.

Figure 5A:
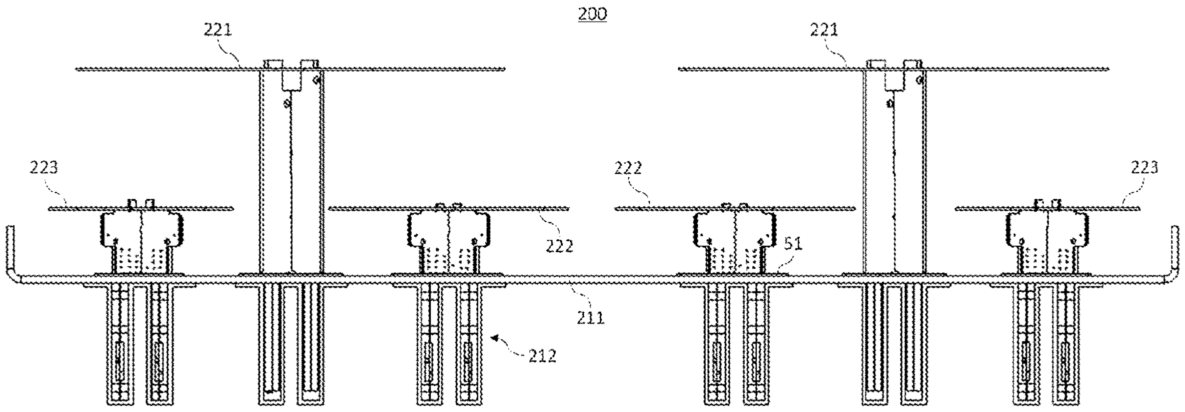
FIG. 5A is a bottom view of a base station antenna according to another embodiment of the present disclosure.
Figure 5B:
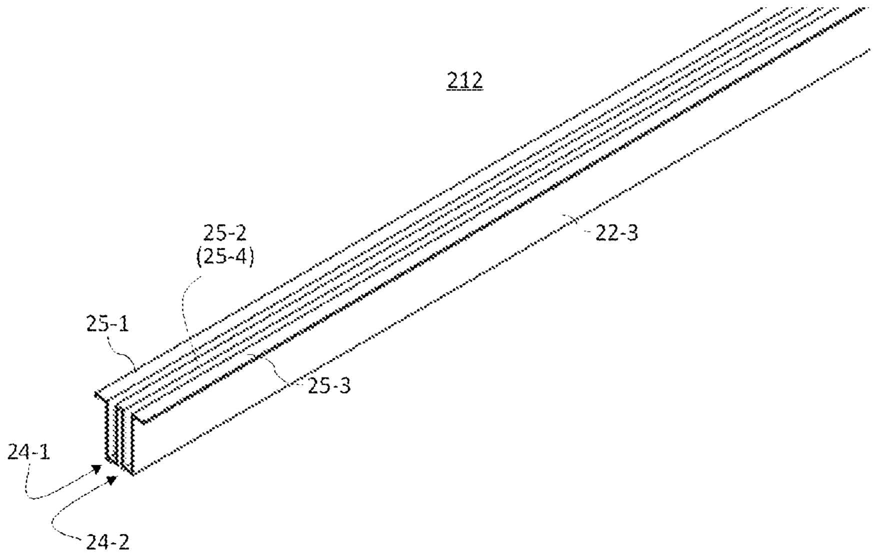
FIG. 5B is a perspective view of part of a cavity element of the antenna of FIG. 5A.
Figure 5C:
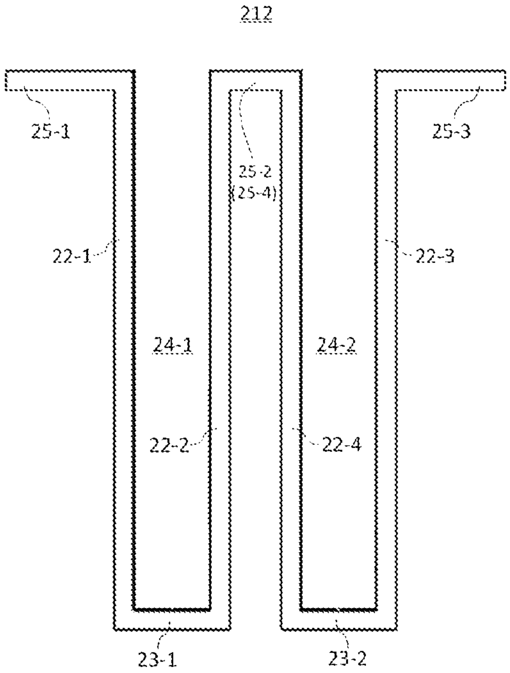
FIG. 5C is a bottom view of the cavity element of FIG. 5B.
Figure 5D:
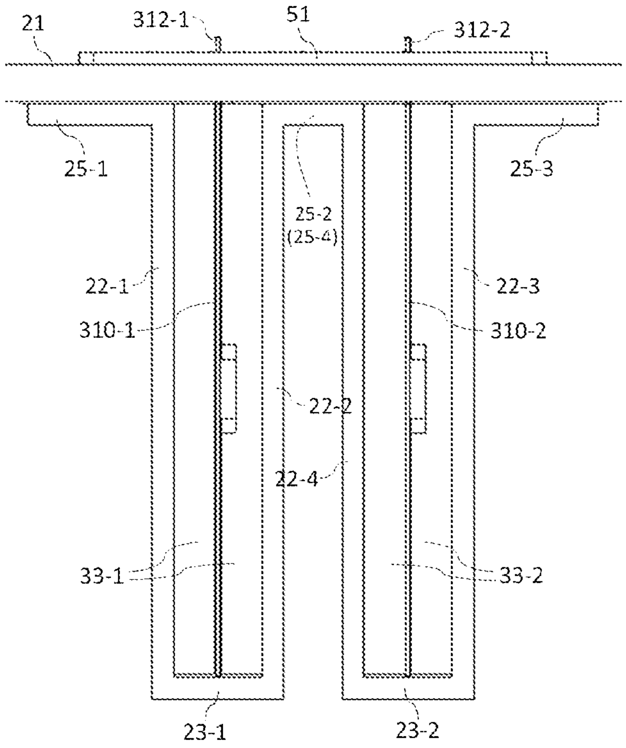
FIG. 5D is an enlarged view of a cavity element of the antenna of FIG. 5A.

FIG. 5A is a bottom view of a base station antenna 200 according to an embodiment of the present disclosure. FIG. 5B is a perspective view of a part of the cavity element 212 of the antenna 200. FIG. 5C is a bottom view of the cavity element 212. FIG. 5D is an enlarged view of a cavity element 212 of the antenna 200. The antenna 200 includes a reflector 211, a plurality of dual-polarized radiating elements 221, 222, 223 installed to extend forwardly from the front surface of the reflector 211, and a plurality of cavity elements 212 located on the reverse surface of the reflector 211. The cavity element 212 provides a chamber 24 for accommodating the conductor strip component 310. Each cavity element 212 extends basically the entire length of the reflector 211 for accommodating a conductor strip component for feeding the linear arrays of radiating elements. The cavity element 212 includes mutually parallel ground plates 22-1 and 22-2 extending basically perpendicular to the reflector 211, defining the chamber 24-1 for accommodating the conductor strip component 310-1. The forward edge parts of the ground plates 22-1 and 22-2 extend laterally away from the chamber 24-1, respectively to form the coupling parts 25-1 and 25-2 that are basically parallel to the reflector 211, and the coupling parts 25-1 and 25-2 are electrically coupled (for example, by capacitive coupling) to the reflector 211 via the dielectric layer 27 (also identified as a planar element 21 in the figure), respectively, so as to make the reflector 211 ground together with the ground plates 22-1 and 22-2 without welding, thus improving the passive intermodulation (PIM) performance of the base station antenna. Similarly, the cavity element 212 also includes mutually parallel ground plates 22-3 and 22-4 extending basically perpendicular to the reflector 211, defining the chamber 24-2 for accommodating the conductor strip component 310-2. The forward side parts of the ground plates 22-3 and 22-4 extend laterally away from the chamber 24-2, respectively to form the coupling parts 25-3 and 25-4 that are basically parallel to the reflector 211, and the coupling parts 25-3 and 25-4 are respectively electrically coupled to the reflector 211 via a dielectric layer 27 (which may be made of polypropylene PP, for example), wherein the coupling parts 25-2 and 25-4 located between the chambers 24-1 and 24-2 are configured as the same coupling part.

To ensure the stability of the mechanical connection between the cavity element 212 and the reflector 211, screws or clamps can be used for fixing. In a specific example, the coupling parts 25-1 and 25-3 are fixedly connected with the reflector 211 by screws (such as screws 55 in FIGS. 13A and 13B), and the coupling parts 25-2(25-4) are fixedly connected with the reflector 211 by plastic clamps. In order to ensure the effectiveness of the ground connection between the cavity element 212 and the reflector 211, the thickness of the dielectric layer 27 cannot be too thick. In a specific example, the thickness of the dielectric layer 27 is 0.1 mm. It is also necessary to ensure that the coupling area between the cavity element 212 and the reflector 211 is sufficient, so that the cavity element 212 and the reflector 211 can be effectively grounded together. In a specific example, the lateral width of each of the coupling parts 25-1 and 25-2 (i.e., the lateral extension length of the edge of the ground plate 22) is 12 mm. In addition, in order to ensure the grounding performance of the grounding plates 22-2 and 22-4 located between the two cavities 24, the lateral extension length of the coupling part 25-2(25-4) is not less than half of the lateral extension length of either of the coupling parts 25-1 and 25-2. In a specific example, the lateral width of the coupling part 25-2(25-4) is 8 mm.

Figure 13B:
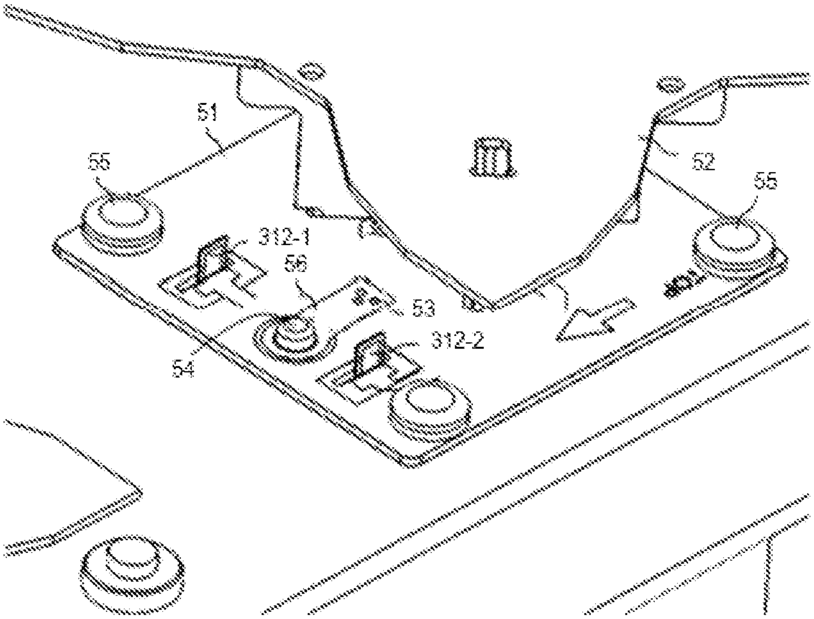

The antenna 200 further includes feed plates 51 on the front surface of the reflector 211 for feeding power to the radiating elements 221, 222, and 223. The front surfaces of the feed plates 51 are printed with conductor traces configured to feed the radiating elements (for electrical connection with the conductor strip 313 as described below), and the rear surface of each feed plate 51 is printed with a conductor plane for grounding (also referred to as "grounding plane"). The ground plane is electrically coupled to the reflector 211 so as to be grounded together with the reflector 211. In this embodiment, the cavity element 212 and the reflector 211 are commonly grounded by electrical coupling, and the ground planes of the feed plates 51 and the reflector 211 are also commonly grounded by electrical coupling. Therefore, in order to further ensure the continuity of the grounding of the cavity element 212, the reflector 211, and the ground planes of the feed plates 51 (i.e., making the ground potentials of the three be the same, so as to truly realize common grounding). In some embodiments, as shown in FIGS. 13A and 13B, the antenna further includes pins 54. Each pin 54 electrically connects a cavity element 212 to the ground plane of the feed plate 51 to ensure continuity of grounding among the cavity element 212, the reflector 21 and the ground plane of the feed plate 51.

In the embodiment shown in FIGS. 13A and 13B, the coupling part 25-2 (25-4), the reflector 21, and the feed plates 51 respectively include first to third openings at corresponding positions. The feed plates 51 are provided with plated through holes (PTH) 53 passing through its dielectric substrate and electrically connecting the conductor trace on its upper surface to the ground plane on its lower surface. The front surface of each feed plate 51 is printed with a conductor trace 56 including a bonding pad surrounding the third opening, and a line part electrically connecting the pad to the PTH 53. The pin 54 passes through the first to third openings sequentially. In the lower section of the pin 54, the pin 54 is electrically connected to the coupling part 25-2(25-4) through the first opening by a pressure riveting process, thereby being electrically connected to the cavity element 212. In the upper section of the pin 54, the pin 54 passes through the third opening and is electrically connected to the bonding pad on the upper surface of the feed plate 51 by welding, and is further electrically connected to the ground plane of the feed plate 51 through the conductor trace 56 and the PTH 53. In the middle of the pin 54, the pin 54 passes through the second opening but is not electrically connected with the reflector 21. Thus, on the basis of the electrical coupling connection between the cavity element 212 and the reflector 211 and that between the ground plane of the feed plate 51 and the reflector 211, the cavity element 212 and the ground plane of the feed plate 51 are electrically connected, thus ensuring the continuity of grounding among the cavity element 212, the reflector 21 and the ground plane of feeder plate 51.

Figure 7A:
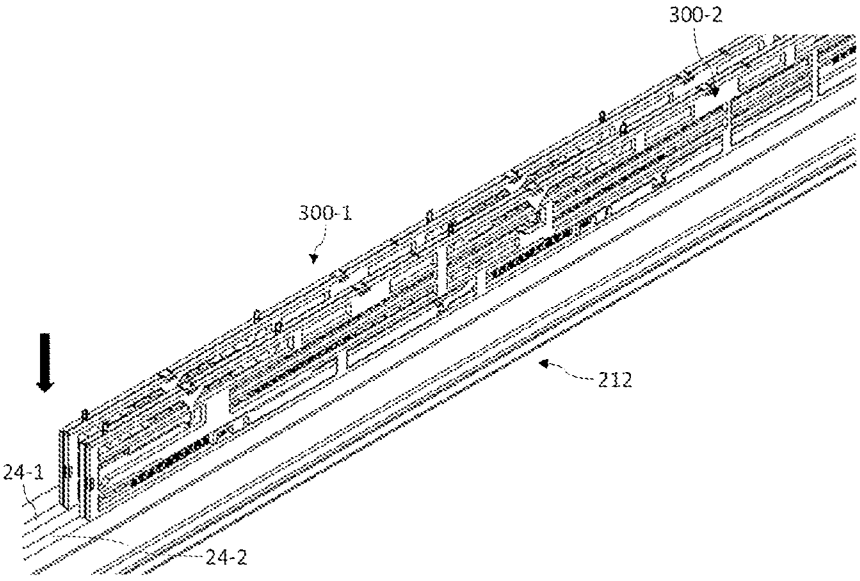
FIG. 7A is a schematic diagram showing the content component loaded into the chamber according to an embodiment of the present disclosure.
Figure 7B:
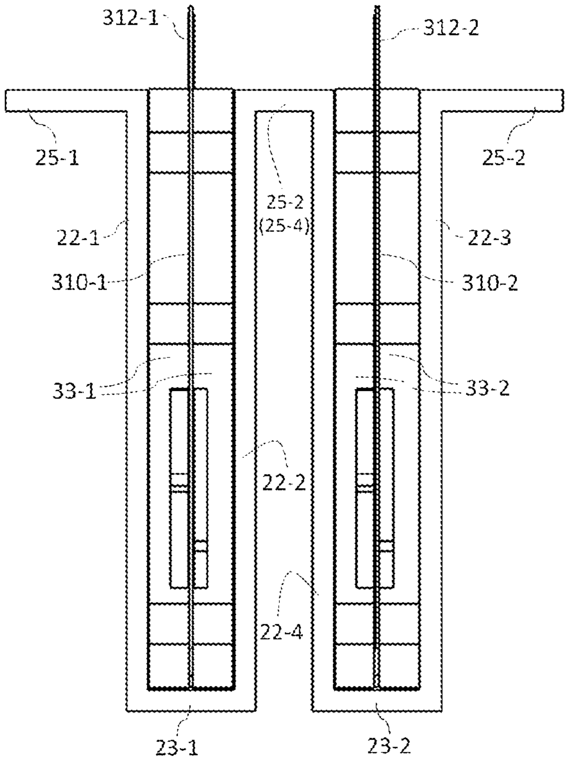
FIG. 7B is a bottom view after the content component shown in FIG. 7A installed in the chamber.

Similar to the embodiment shown in FIGS. 3A to 3F, in the embodiment shown in FIGS. 5A to 5D, the conductor strip 313 of the conductor strip component 310 extends on the plane between the adjacent ground plates 22, so that the conductor strip 313 and the ground plates 22 located on both sides thereof constitute a stripline transmission line to fee the radiators. Since the cavity element 212 has an upward opening (toward the front side of the base station antenna), the content component 300 can be conveniently loaded into the cavity element 212, as shown by the arrow direction in FIG. 7A. The bottom view of the content component 300 after being installed in the cavity element 212 is shown in FIG. 7B, and the output parts 312 may protrude to the front of the planar element 21 (i.e., the reflector), as shown in FIG. 5D. Therefore, in this embodiment, the support 42 in the preceding embodiment is not needed, so that the depth of the cavity element 212 (the distance from the planar element 22 to the partition plate 23) can be smaller than the depth of the cavity component 111.

The transition between the stripline transmission line formed by the conductor strip 313 and the ground plates 22 on both sides thereof, and the coaxial transmission line 70 for transmitting RF signals between the radio device and the base station antenna will be described below with reference to FIGS. 9A to 9H. The coaxial transmission line 70 includes an inner conductor 72 and an outer conductor 71, wherein the inner conductor 72 is electrically connected to the input part 311 of the conductor strip 313 via a transition piece 620, and the outer conductor 71 is electrically coupled to the partition plate 23 via a transition piece 610. The transition piece 620 includes a joint part 621 configured in a curved shape (e.g., an arc surface) so as to be soldered to the inner conductor 72 to at least partially surround the inner conductor 72. The joint part 621 configured in a curved shape may have a larger joint area with the inner conductor 72, and may also be configured as a container for accommodating solder and hold the inner conductor 72 at the same time. The transition piece 620 further includes a joint part 622 configured in a flat shape so as to be connected (e.g., welded) to the input part 311 in a planar contact manner. The joint part 622 may extend into the chamber 24 through an opening in the partition plate 23 and/or the ground plate 22, so as to be electrically connected to the input part 311 by, for example, welding (for example, in the embodiment shown in FIGS. 9A and 9B, the conductor strip 313 is a conductor circuit printed on the dielectric substrate 314) or welding plus screw connection (for example, in the embodiment shown in FIGS. 9C to 9E, the conductor strip 313 is made of sheet metal). It should be understood that the joint part 621 and the joint part 622 of the transition piece 620 are configured as one piece or electrically connected.

The transition piece 610 includes a joint part 612 configured in a curved shape for being welded to the outer conductor 71 in such a manner as to surround at least partially the outer conductor 71, and a joint part 611 configured in a flat shape for being electrically connected to the partition plate 23 in an electrical coupling manner, so that the ground plate 22 configured as one piece with the partition plate 23 is grounded. In the embodiment shown in FIGS. 9A to 9D, the coaxial transmission line 70 is fixed on the outer side of the partition plate 23 by the fixing piece 41, and the transition piece 610 is constructed in an approximately "L" shape. One leg of the "L" is configured as a joint 612 for upper joining and supporting the outer conductor 71, and the other leg is configured as a joint 611 for lower coupling to the partition plate 23. In the embodiment shown in FIG. 9E, the coaxial transmission line 70 is fixed on the outer side of the ground plate 22 by the fixing element 41, and the transition element 610 is roughly configured in a "H" shape matching the shape of the bottom of the cavity component 111 or the cavity element 212. A joint 611 is constructed in the middle of the transition piece 610 and positioned on the outer surface of the partition plate 23, and two joint parts 612 are respectively constructed at the ends of the two legs of the "H" shape so as to be respectively connected with the outer conductors 71 of the coaxial cables 70 respectively serving as two polarized signals of a linear array of a dual-polarized radiating element. It should be understood that the joint part 611 and the joint part 612 of the transition piece 610 are configured as one piece or electrically connected.

Figure 9G:
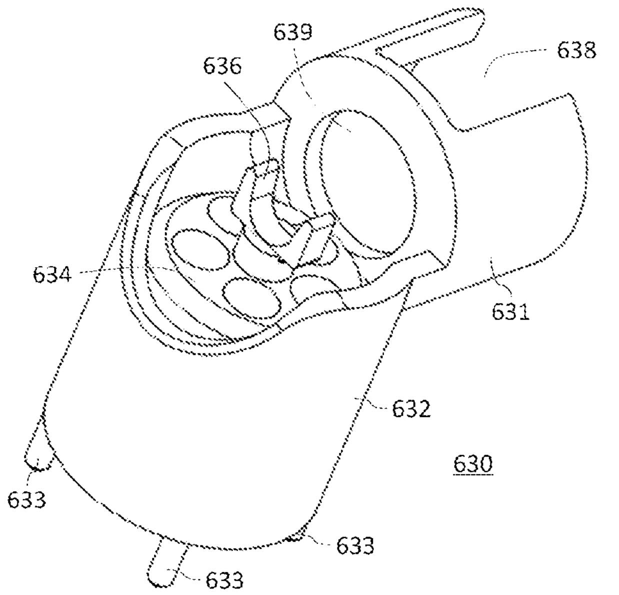
FIG. 9G is a perspective view of a transition piece in FIG. 9F.
Figure 9H:
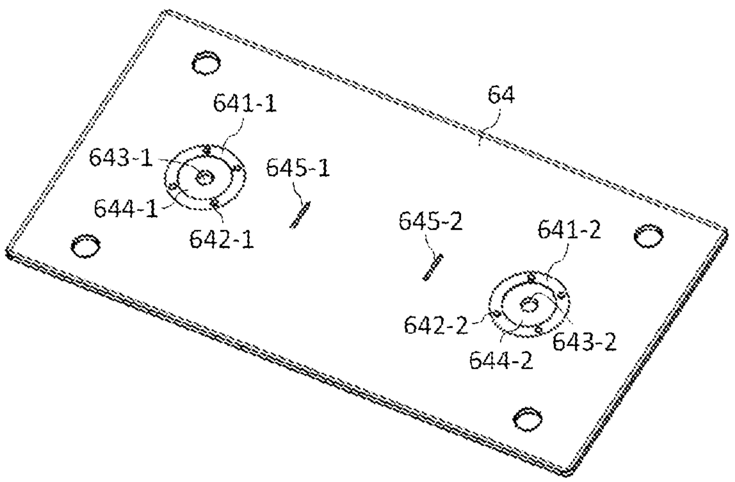
FIG. 9H is a perspective view of another transition piece in FIG. 9F.

In an embodiment, the transition between the stripline transmission line and the coaxial transmission line 70 is realized by a transition element 630 and a transition printed circuit board 64 as shown in FIGS. 9F to 9H. Unlike in the embodiment shown in FIGS. 9A to 9E where the input part 311 of the conductor strip 313 is located at the edge of the stripline transmission line away from the reflector 21, for example, near the partition plate 23, in this embodiment, the input part 311 of the conductor strip 313 is located at the edge of the stripline transmission line near the reflector 21. The input part 311 extends and passes through the reflector 21 and the transition printed circuit board 64 to the front of the reflector 21. The coaxial transmission line 70 is positioned on the rear side of the reflector 21 in parallel with the reflector 21 and near the input part 311. A transition printed circuit board 64 is placed on the front surface of the reflector 21. The rear surface of the transition printed circuit board 64 is provided with a ground plane, and the ground plane is electrically coupled to the reflector 21.

As shown in FIG. 9H, the transition printed circuit board 64 for a cavity element 212 or a cavity component 111 is provided with two slots 645-1 and 645-2 penetrating the board 64 for the input parts 311-1 and 311-2 of the conductor strip components 310-1 and 310-2 to pass through and protrude forwardly from the board 64. The forward surface of the transition printed circuit board 64 also includes annular grooves 641, each groove 641 is provided with four PTHs 642 uniformly distributed along the circumferential direction, and the PTHs 642 are conductively connected with the ground plane of the rear surface of the transition printed circuit board 64. A through hole 643 is provided at the approximate center of the annular groove 641, and a conductor trace is printed between the through hole 643 and the annular groove 641 to form a bonding pad 644.

As shown in FIG. 9G, a transition element 630 for a coaxial transmission line 70 includes a joint part 631 having an arc surface for joining the outer conductor 71 of the coaxial transmission line 70. As shown in FIG. 9F, the outer conductor 71 extends from one end of the joint 631 into the space surrounded by the arc surface of the joint 631, making it possible for the joint 631 to be welded to the outer conductor 71 and thereby surround at least partially the outer conductor 71. The arc surface has an opening 638 for feeding a welding aid material during welding. At least part of the other end of the joint part 631 is connected (including mechanical connection and electrical connection) to the cylindrical part 632, and four protrusions 633 extend from the end of the cylindrical part 632. The joint part 631 is basically at a right angle to the extending direction of the cylindrical part 632 to switch the direction of electrical connection, for example, from a direction basically parallel to the reflector 21 to a direction basically perpendicular to the reflector 21. The protrusions 633 respectively pass through the corresponding PTHs 642 on the board 64, and are electrically connected (e.g., soldered) with the PTHs 642, thereby being electrically connected to the ground plane of the transition printed circuit board 64. Since the ground plane of the board 64 is electrically coupled to the reflector 21, and the reflector 21 is coupled to the ground plate 22 or is constructed as one piece, the transition element 630 can electrically connect the outer conductor 71 to the reflector 21 and the ground plate 22 so that the reflector 21 and the ground plate 22 are grounded together.

The transition element 630 further includes a transition piece 635 for transition connection of the inner conductor 72. The transition piece 635 includes joint parts 636 and 637 at both ends thereof, respectively. One end of the joint part 631 is provided with an opening 639 so that the inner conductor 72 protrudes from the opening 639 (the inner conductor 72 is longer than the outer conductor 71), so that the joint part 636 having an arc surface is welded to the inner conductor 72 in such a manner as to surround at least partially the inner conductor 72. The joint part 637 passes through the through hole 643 on the board 64, protrudes upward from the board 64, and is welded to the pad 644. The pad 644 may be electrically connected to the input part 311 which also protrudes upward from the board 64 through conductor traces printed on the upper surface of the board 64. In this way, the transition element 63 can also electrically connect the inner conductor 72 of the coaxial transmission line 70 to the input part 311 of the conductor strip 313.

Next, the transition between the conductor strip 313 and a feed plate 51 (implemented by the printed circuit board) located on the front side of the reflector 21 for feeding the radiation element 52 will be described with reference to 10A to 10D. In the embodiment shown in FIGS. 10A and 10B, the output part 312 of the conductor strip 313 may protrude to the front side of the feed plate 51 through the corresponding openings on the reflector 21 and the feed plate 51 (therefore, also referred to as protruding part), so that the output part 312 is directly welded to the conductor trace on the feeder plate 51. In the embodiment shown in FIGS. 10C and 10D, the output part 312 may not extrude to the front side of the reflector 21 or the feed plate 51 (above the feed plate 51 in the direction shown in the figure), and a pin 63 (also called "PIN") is used to electrically connect the output part 312 to the conductor trace on the feed plate 51. For example, the first end of each pin 63 extends between the ground plates 22 to be soldered to the corresponding output part 312, and the second end of each pin 63 extends to the front side of a dielectric substrate of the feed plate 51 to be soldered to the conductor trace.

The front surface of the feed plate 51 is printed with conductor traces, and the rear surface is provided with a ground plane, so that the conductor traces on the feed plate 51 become micro-strip transmission lines for feeding the radiating elements. Since the reflector 21 and the ground plate 22 are grounded together, the ground plane of the feed plate 51 only needs to be grounded with the reflector 21, and does not need to be grounded with the ground plate 22 of the stripline transmission line. Therefore, the connection (usually by soldering) between the ground plane of the micro-strip transmission line and the ground plate of the stripline transmission line can be omitted. In some embodiments, the rear surface of the feed plate 51 is printed with a conductor plane which is capacitively coupled to the reflector 21 (for example, the feed plate 51 is mounted on the front surface of the reflector 21 so that the conductor plane printed on the rear surface is electrically coupled to the reflector 21 via solder resist ink coated on the conductor plane), thereby being commonly grounded with the reflector 21. In some embodiments, the rear surface of the feed plate 51 has no printed conductor, but the rear surface of the dielectric substrate of the feed plate 51 is closely attached to the front surface of the reflector 21, so that the reflector 21 serves as a ground plane for the conductor traces of the feed plate 51.

Figure 10A:
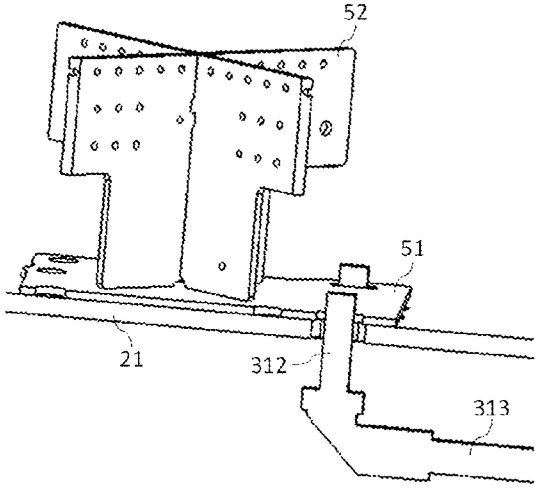
FIG. 10A is a perspective view of the transition between the stripline transmission line and the feed plate in the base station antenna according to an embodiment of the present disclosure.
Figure 10B:
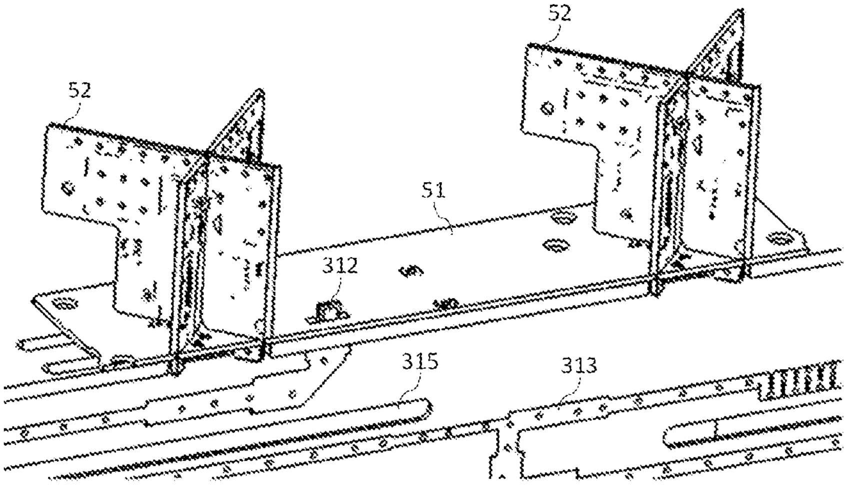
FIG. 10B is a perspective view of the transition between the stripline transmission line and the feed plate in the base station antenna according to an embodiment of the present disclosure.
Figure 10C:
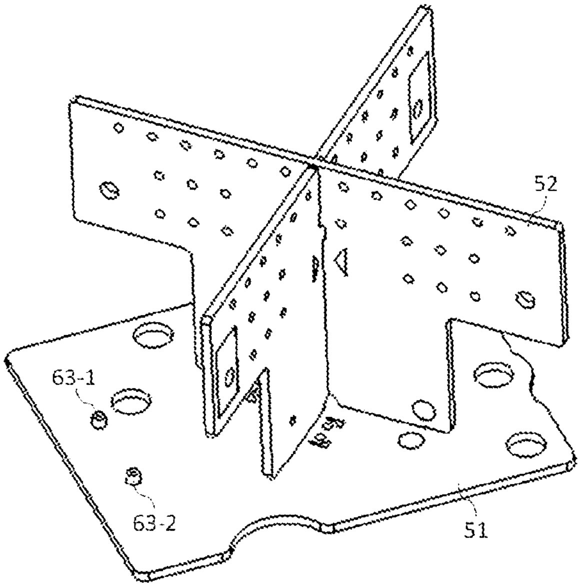
FIGS. 10C and 10D are schematic diagrams of the transition between the stripline transmission line and the feed plate in the base station antenna according to an embodiment of the present disclosure.
Figure 10D:
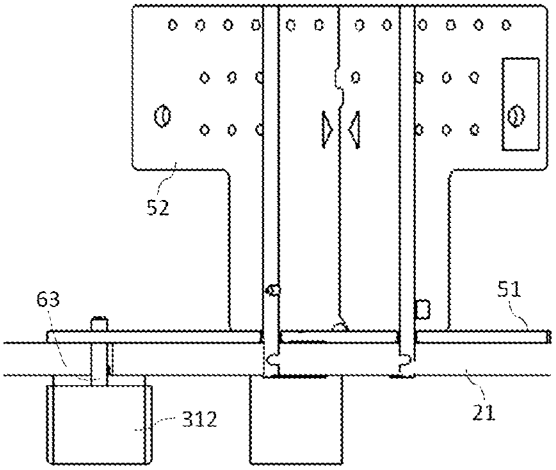

In the example shown in FIG. 10A, a pair of output parts 312 (for two polarized radiators respectively) and one feed plate 51 are used to feed a single radiating element 52. In this case, the conductor strip 313 is configured to have a number of output parts 312 that is equal to the number of radiating elements in the linear array fed by it. For example, in the embodiment shown in FIGS. 3A to 3F, the number of output parts 312 of the conductor strip 313 placed in the chamber 24 of cavity component 111-3 is equal to the number of radiating elements 161 in a corresponding linear array of the array 160. In the example shown in FIG. 10B, a pair of output parts 312 and a feed plate 51 are used to feed two radiation elements 52. In this case, the conductor strip 313 may be configured to have a number of output parts 312 equal to half of the number of radiating elements in the linear array fed by it. The antenna beam obtained by using the feeding method shown in FIG. 10A may have better sidelobe performance than the antenna beam obtained by using the feeding method shown in FIG. 10B.

The depth of the cavity component 111 or the cavity element 212 is limited by the antenna size. In some cases, for example, when the conductor strip 313 is implemented as sheet metal, the depth of the cavity component 111 or the cavity element 212 may not be enough to accommodate the conductor strip 313. In this case, two cavities 24 (even more, if necessary) placed in parallel in the lateral direction can be configured for a linear array of polarized radiators, the conductor strip 313 can be divided into two parts accordingly, and these two parts are arranged in these two cavities 24 respectively. That is, the stripline transmission line used to feed the linear array of polarized radiators is divided into two sections placed horizontally and side-by-side to reduce the depth of the cavity component 111 or cavity element 212. Description will be made below with reference to 11A to 11C.

Figure 11A:
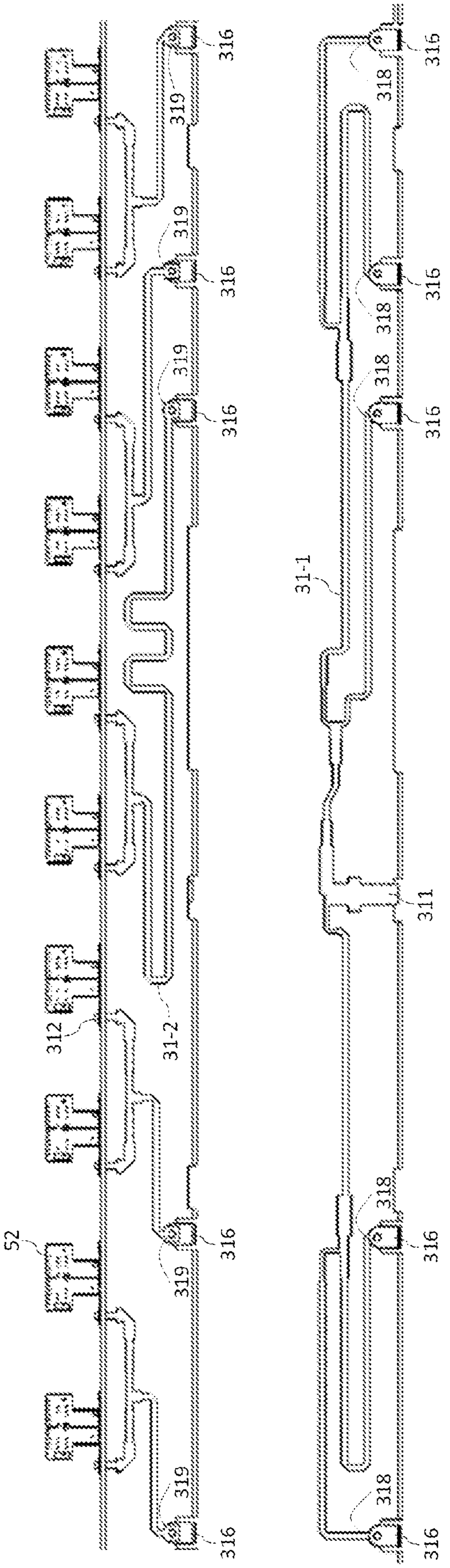
FIG. 11A is a side view of a segmented conductor strip in the base station antenna according to an embodiment of the present disclosure.
Figure 11B:
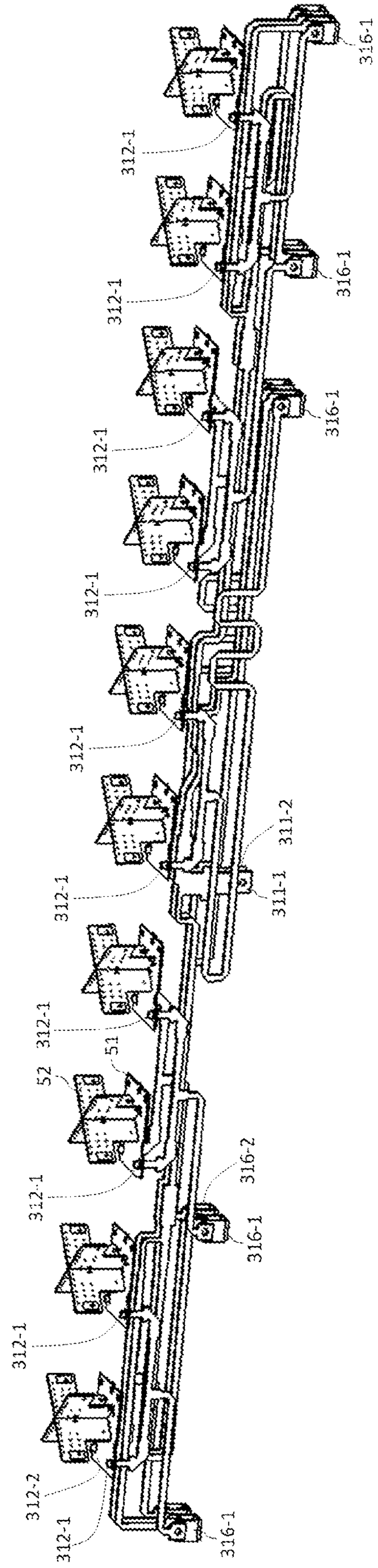
FIG. 11B is a perspective view of a segmented conductor strip in the base station antenna according to an embodiment of the present disclosure.

In the embodiment shown in FIG. 11A, a first section of the stripline transmission line used to feed a linear array arranged by the polarized radiators of the radiating elements 52 includes a part 31-1 of the conductor strip 313 with a long electrical distance to the radiators, and the second section of the stripline transmission line includes a part 31-2 of the conductor strip 313 with a short electrical distance to the radiators. The parts 31-1 and 31-2 are laterally adjacent and at least partially overlapped, so that both the first and second sections of the stripline transmission line extend rearwardly from the reflector 21. In the illustrated embodiment, the part 31-1 of the conductor strip 313 is a 1-5 power divider from the input part 311 to the divided part 318, and the part 31-2 is a 1-2 power divider from each divided part 319 to the corresponding output part 312. The corresponding divided parts 318 and 319 are electrically coupled with each other through a connecting piece 316.

Figure 11C:
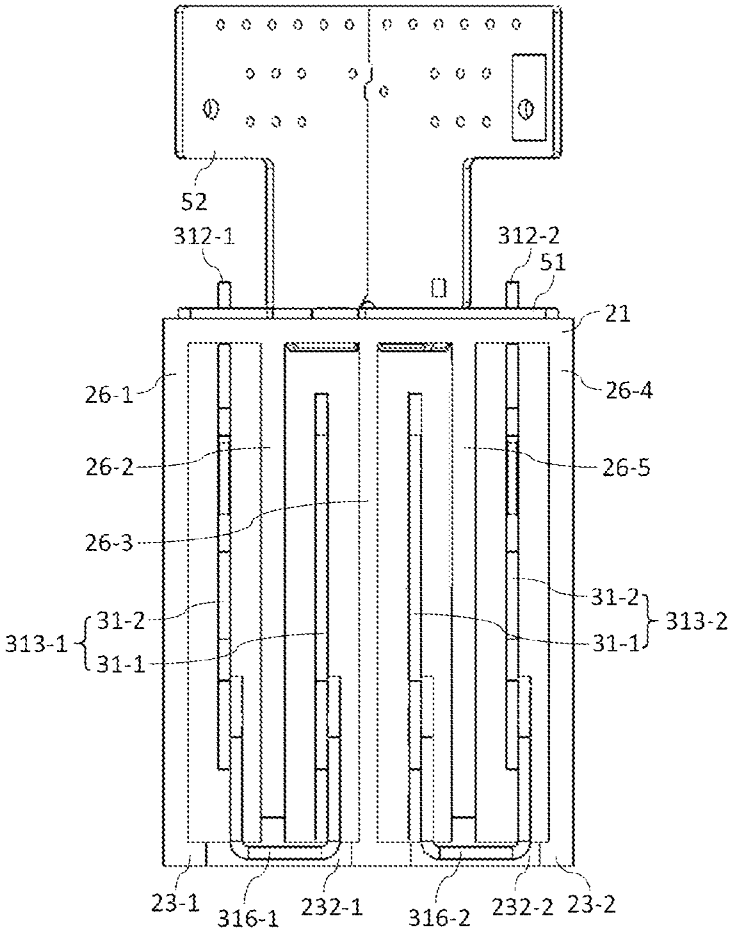
FIG. 11C is a bottom view of a base station antenna with a segmented conductor strip at the cavity component according to an embodiment of the present disclosure.

As shown in FIG. 11C, the output parts 312-1 and 312-2 are used to feed the first and second polarized radiators of the radiating element 52, respectively. For the conductor strip 313-1 having the output part 312-1, the ground plates 26-1 and 26-2 extending backward from the planar element 21 form a first chamber for accommodating the part 31-2, and the ground plates 26-2 and 26-3 form a second chamber for accommodating the part 31-1, and the bottoms of both chambers are enclosed by the partition plate 23-1. The partition plate 23-1 is provided with a hole 232-1 through which the connector 316-1 passes, so as to connect the corresponding divided parts of the parts 31-1 and 31-2 located in the first and second chambers, respectively. For the conductor strip 313-2 with the output part 312-2, the ground plates 26-4 and 26-5 form a first chamber for accommodating the part 31-2, and the ground plates 26-5 and 26-6 form a second chamber for accommodating the part 31-1, and the bottoms of both chambers are basically separated from the outside by the partition plate 23-2. The partition plate 23-2 is provided with a hole 232-2 through which the connector 316-2 passes, so as to connect the corresponding divided parts of the parts 31-1 and 31-2 located in the first and second chambers, respectively.

Figure 14A:
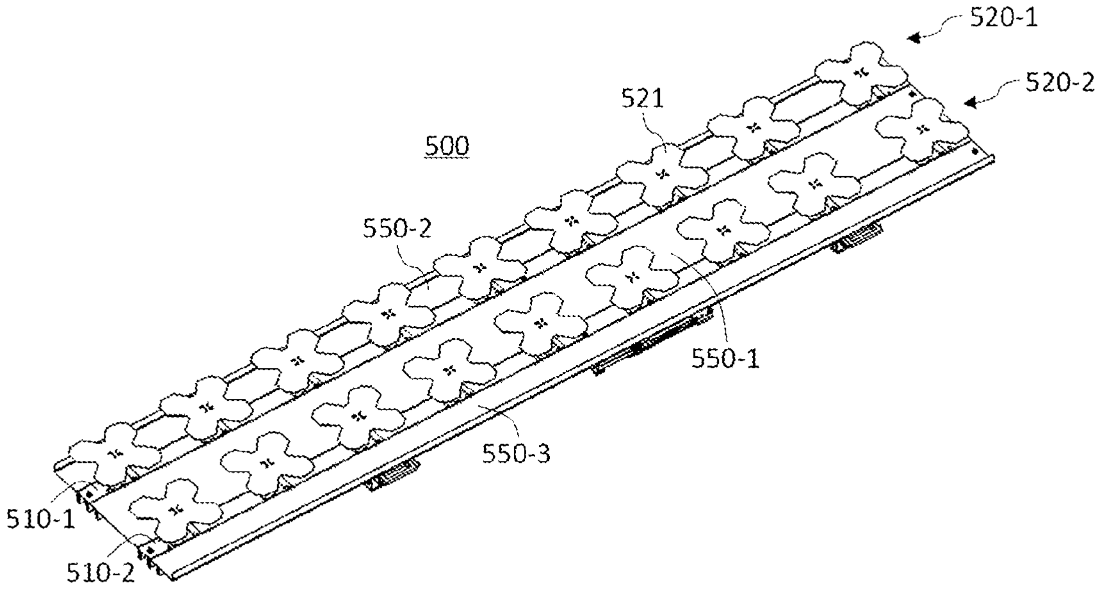
FIG. 14A is a front perspective view of a base station antenna according to an embodiment of the present disclosure.
Figure 14B:
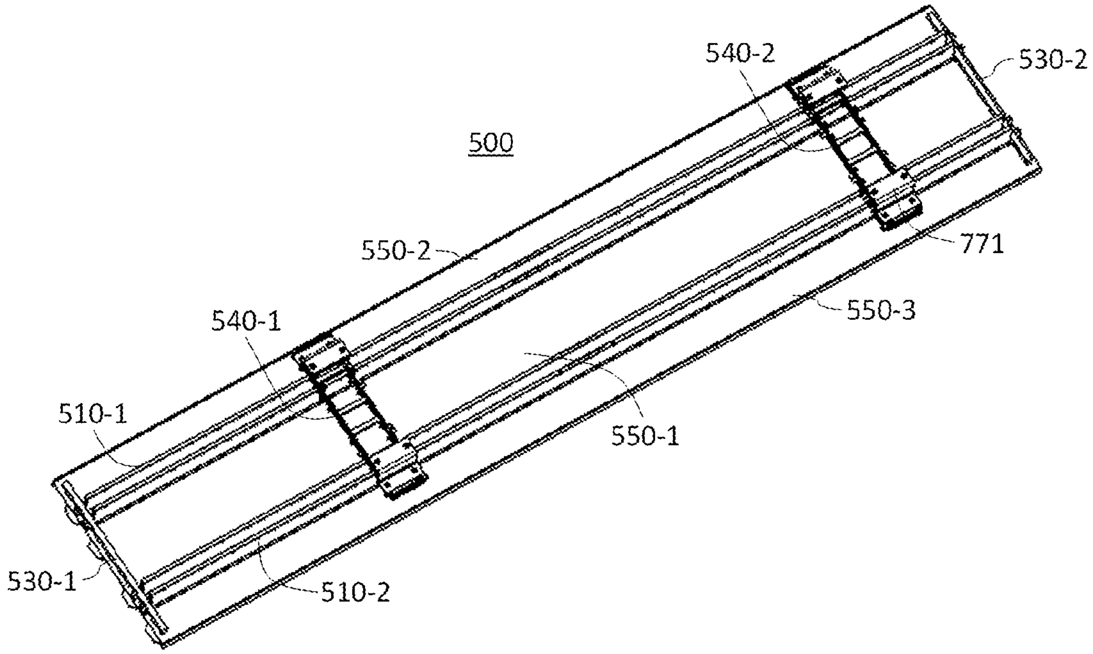
FIG. 14B is a back perspective view of the base station antenna shown in FIG. 14A.
Figure 14C:
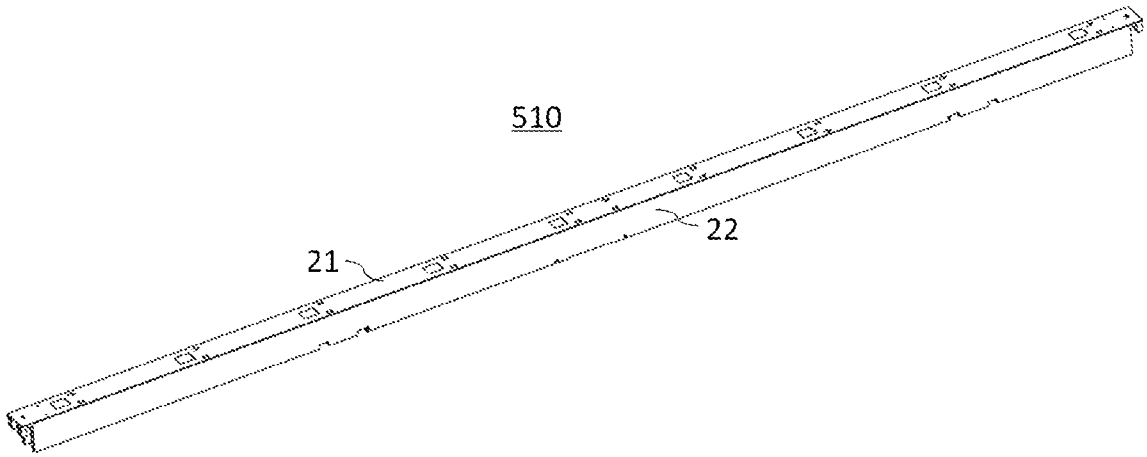
FIG. 14C is a perspective view of a cavity element in the base station antenna shown in FIG. 14A.
Figure 14D:
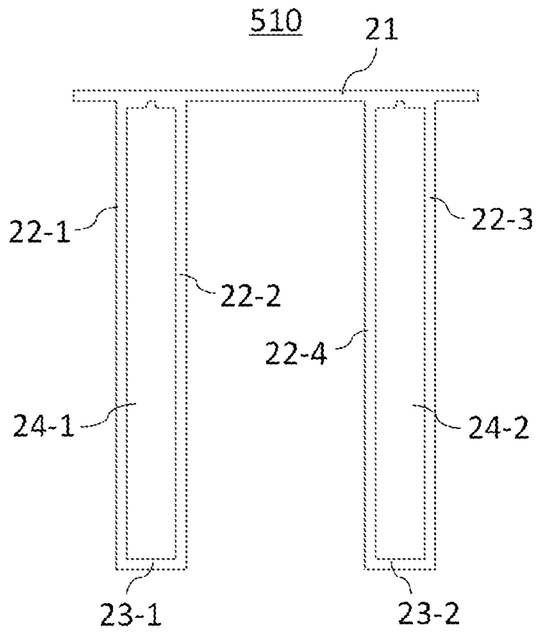
FIG. 14D is a bottom view of the cavity element shown in FIG. 14C.

FIGS. 14A to 14F show a base station antenna 500 according to an embodiment of the present disclosure. The base station antenna 500 includes a plurality of cavity elements 510-1 and 510-2 extending in the longitudinal direction, a plurality of metal plates 550-1 to 550-3, and a plurality of linear arrays 520-1 and 520-2 formed by radiating elements 521 arranged longitudinally. As shown in FIGS. 14C and 14D, the cavity element 510 has a structure similar to that of the cavity element 411 shown in FIG. 12B. The cavity element 510 includes a planar element 21 which can be used as a reflector for reflecting electromagnetic radiation emitted by the radiating elements 521. Each of the cavity elements 510-1 and 510-2 is positioned such that their substantially flat forward surfaces are basically coplanar, so that each of the linear arrays 520-1 and 520-2 has the same azimuth-angle visual-axis pointing direction. The cavity element 510 further includes mutually parallel planar elements 22 extending from the planar element 21 and basically perpendicularly to the rear side of the planar element 21, and a planar element 23 located on the rear side of the planar element 21 and basically parallel to the planar element 21. The planar elements 21 to 23 together define a chamber 24 for accommodating a conductor strip (not shown) which feeds the linear array 520. The way that the conductor strip is loaded into the chamber 24 is similar to the way that the content component 300 is loaded into the frame 110 described with reference to FIGS. 8A to 8C, and thus will not be repeated here. Each cavity element 510 extends substantially the entire length of the base station antenna 500 in the longitudinal direction. The planar elements 21 to 23 are constructed as an integral piece. For example, they are integrally formed by a pultrusion process based on metallic materials, so that the planar elements 21 to 23 are grounded together without welding.

Compared with the cavity element 411 shown in FIG. 12B, the planar element 21 used as a reflector in the cavity element 510 may have a smaller width which, for example, may be slightly wider than the feed plates 51 located on the front surface of the reflector for feeding the radiating element 521. Therefore, compared with the frame 410 shown in FIG. 12A, the cavity elements 510 of the base station antenna 500 may be separated from each other. In order to ensure the lateral continuity and lateral width of the reflectors used for the entire base station antenna 500, and to make the reflectors (that is, respective planar elements 21) provided by the cavity elements 510-1 and 510-2 grounded in common, the base station antenna 500 further includes a metal plate 550. A first edge part of the metal plate 550-1 and the edge part of the planar element 21 of the cavity element 510-1 overlap back and forth (and understandably, a thin layer of dielectric material is filled in between) to form a first capacitive coupling connection (reference may be made to FIG. 17C), a second edge part of the metal plate 550-1 and the edge part of the planar element 21 of the cavity element 510-2 overlap back and forth to form a second capacitive coupling connection, so that the reflectors provided by each of the cavity elements 510-1 and 510-2 are commonly grounded. The metal plates 550-2 and 550-3 are symmetrically arranged on two lateral edge parts of the base station antenna 500. Each metal plate 550-2 and 550-3 has a first part extending parallel to the substantially flat forward surfaces of the reflectors provided by the cavity elements 510-1 and 510-2, and a second part extending from the first part to the front of the base station antenna 500. The edge parts of the first parts of the metal plates 550-2 and 550-3 and the edge part of the planar element 21 of the corresponding cavity element 510 overlap back and forth to form a capacitive coupling connection, so that the metal plates 550-2 and 550-3 and the reflector provided by the corresponding cavity element 510 are commonly grounded. The second parts of the metal plates 550-2 and 550-3 are used to adjust the radiation pattern of the linear array 520.

Figure 14E:
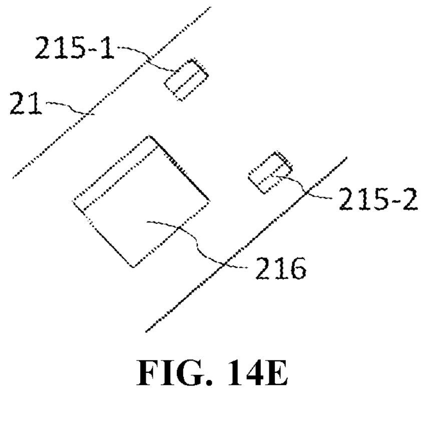
FIG. 14E is an enlarged view of a partial structure of the cavity element shown in FIG. 14C.
Figure 14F:
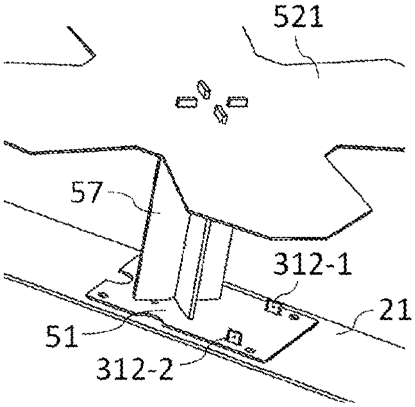
FIG. 14F is a schematic diagram in which a radiating element is mounted to the cavity element shown in FIG. 14C.

Compared with the cavity element 411 shown in FIG. 12B, the two chambers 24-1 and 24-2 provided by the cavity element 510 have a relatively greater lateral spacing distance, so that each radiating element 521 of the linear array 520 can be mounted to the planar elements 21 of the corresponding cavity elements 510. As shown in FIGS. 14E and 14F, openings 215-1 and 215-2 are provided on the planar element 21 at positions corresponding to the chambers 24-1 and 24-2 respectively, so that the output parts 312-1 and 312-2 of the conductor strips respectively protrude from the chambers 24-1 and 24-2 through the openings 215-1 and 215-2 to the front side of the planar element 21 to feed the corresponding radiating element 512 through the transmission lines on the feeding plates 51. The transition mode between the output parts 312-1 and 312-2 and the corresponding transmission line on the feeding plate 51 is similar to the transition mode between the conductor strip 313 and the feeding plate 51 described with reference to FIGS. 10A to 10D, and will not repeated here. The planar element 21 is provided with an opening 216 at a position between the chambers 24-1 and 24-2, and the bottom of the supporting/feeding element 57 of the radiating element 512 can pass through the feeding plate 51 and the opening 216 to be mounted to the planar element 21. The two chambers 24-1 and 24-2 of the cavity element 510 have a relatively greater lateral spacing distance, which can avoid opening the planar element 22 serving as a side wall of the chamber 24, so that the transmission efficiency of the stripline transmission line constituted by the conductor strip and the planar element 22 becomes higher.

Figure 14G:
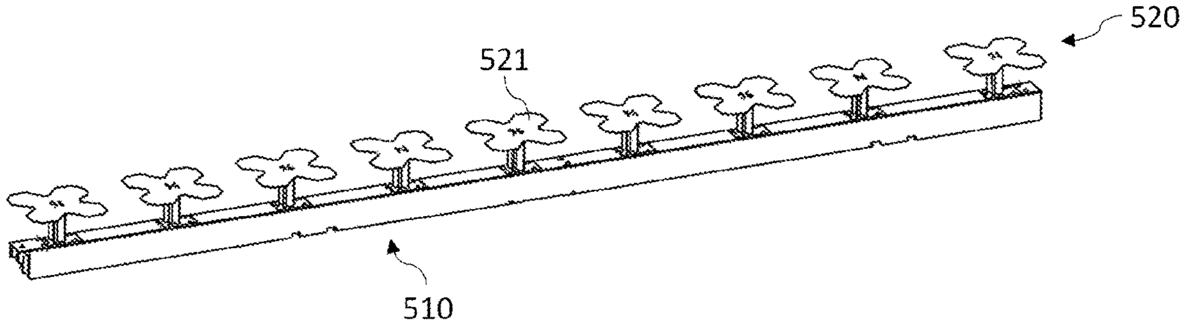
FIG. 14G is a perspective view of a column component in the base station antenna shown in FIG. 14A.
Figure 15A:
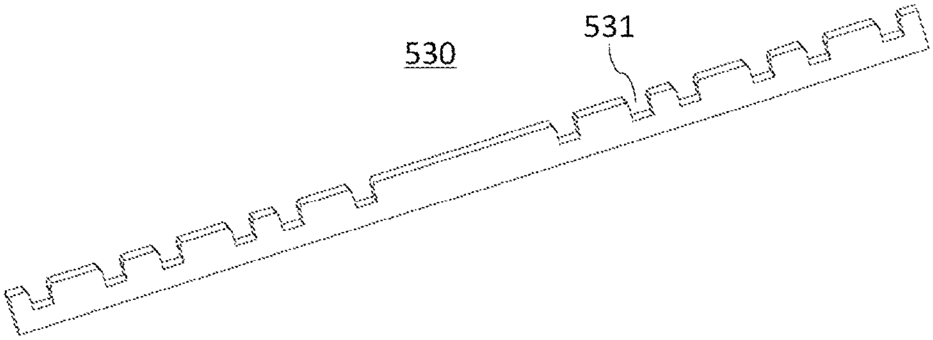
FIG. 15A is a perspective view of a bracket in a base station antenna according to an embodiment of the present disclosure.
Figure 15B:
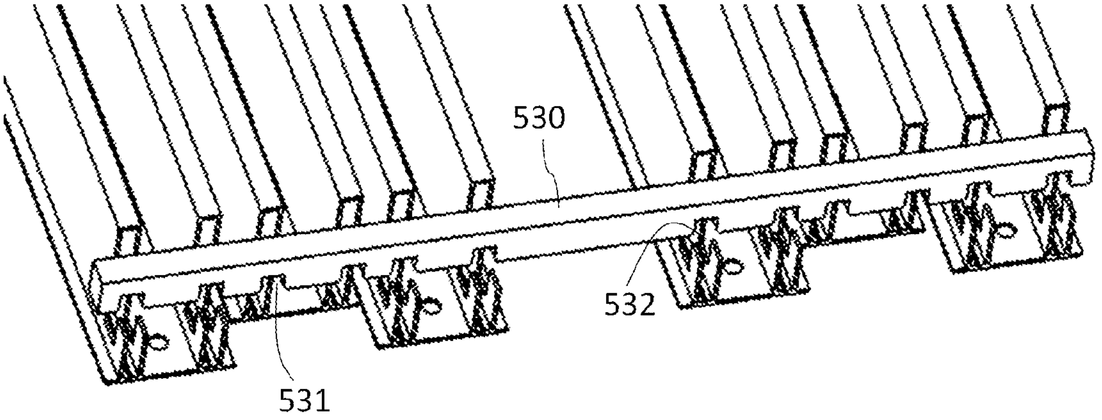
FIG. 15B and FIG. 15C are schematic diagrams showing the matching between the bracket shown in FIG. 15A and a cavity element.
Figure 15C:
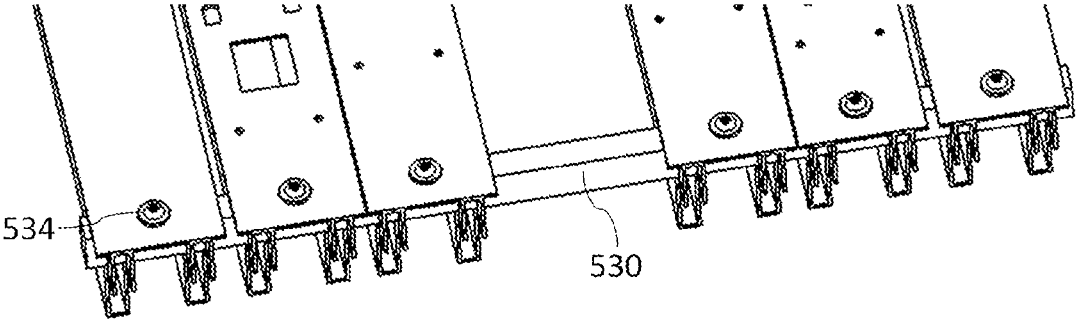
Figure 16A:
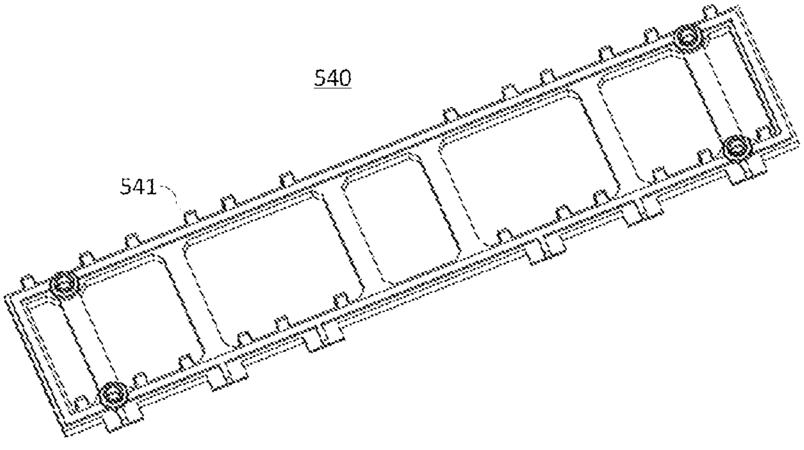
FIG. 16A is a perspective view of a bracket in a base station antenna according to an embodiment of the present disclosure.
Figure 16B:
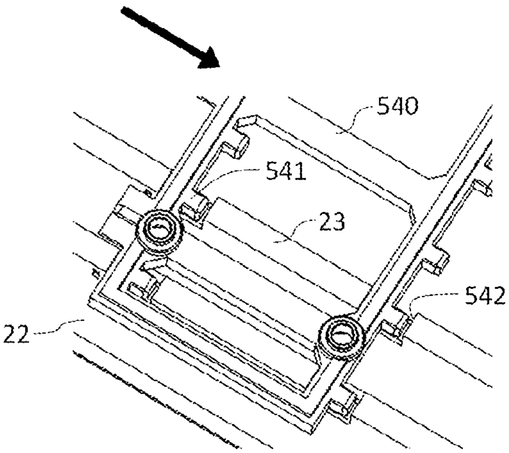
FIG. 16B and FIG. 16C are schematic diagrams showing the matching between the bracket shown in FIG. 16A and a cavity element.
Figure 16C:
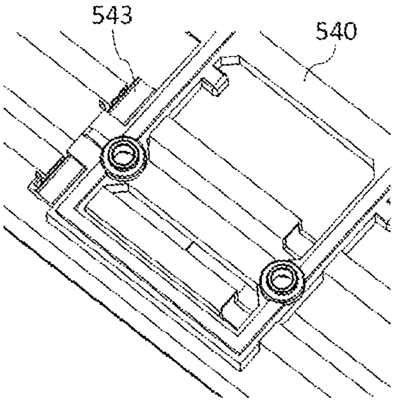

The linear array 520 is mounted to the cavity element 510 to form the column component shown in FIG. 14G. During the manufacture of base station antennas, column components of a number matched with the number of desired linear arrays can be included, and these column components can be positioned according to the desired position of each linear array, for example, fixedly positioned by the bracket 530 and/or the bracket 540 to be described below, which is advantageous for the manufacturing process of the base station antenna. In addition, compared with the frame 110 shown in FIG. 3F or the cavity element 411 shown in FIG. 12B, the cavity element 510 has a smaller width, and thus each of the planar elements 21 to 23 of the cavity element 510 may be allowed to have a smaller thickness, for example, about 1.5 mm, 1.3 mm, or even smaller. The metal plate 550 (for example, a sheet metal material made of aluminum) that does not need to support the radiating element 512 is also allowed to have a thickness smaller than that of a conventional reflector, for example, about 1.5 mm, 1.3 mm, or even smaller. Therefore, the overall weight and cost of the base station antenna 500 will be reduced.

Figure 17A:
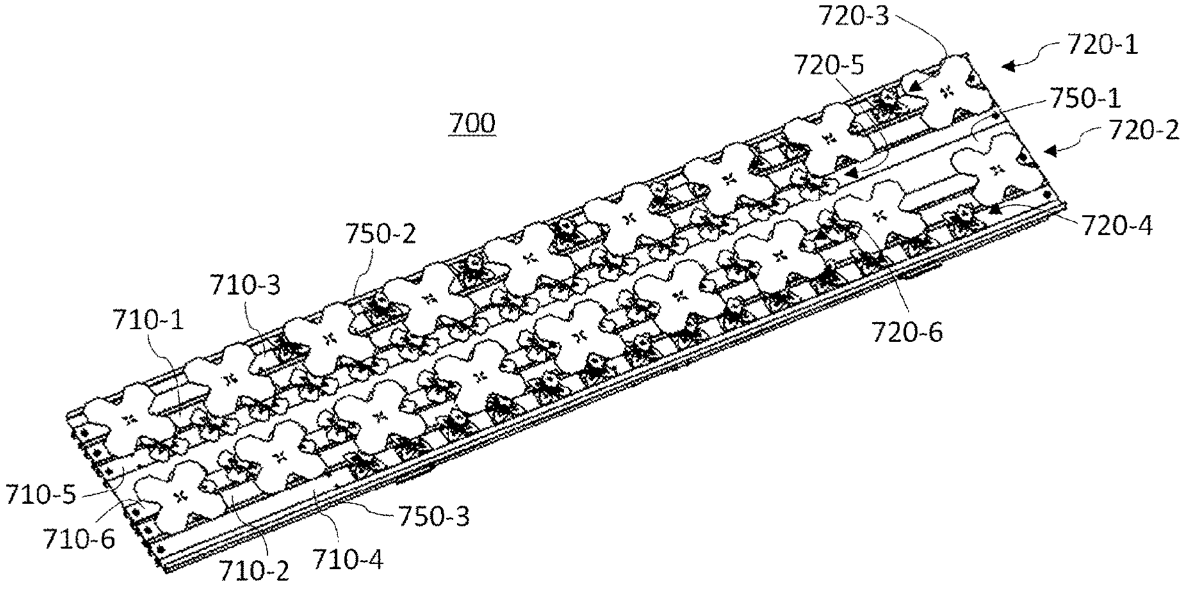
FIG. 17A is a front perspective view of a base station antenna according to an embodiment of the present disclosure.
Figure 17B:
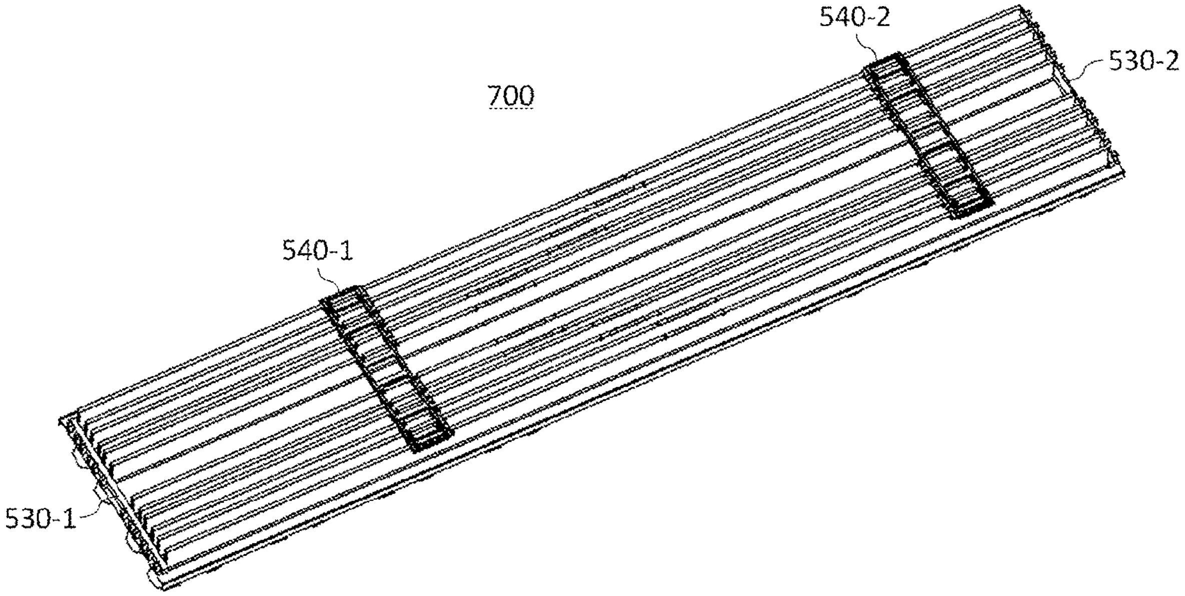
FIG. 17B is a back perspective view of the base station antenna shown in FIG. 17A.
Figure 17C:
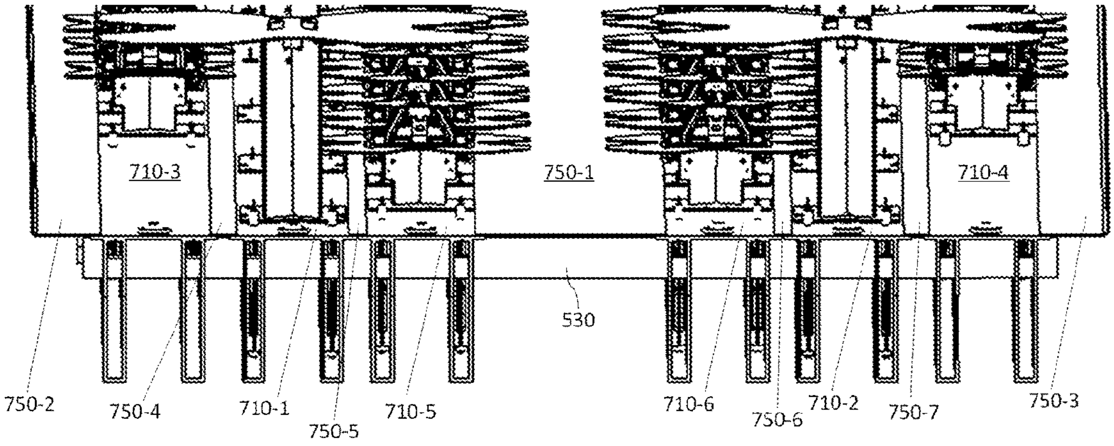
FIG. 17C is an enlarged view of a partial structure of the base station antenna shown in FIG. 17A.

FIGS. 17A to 17C show a base station antenna 700 according to an embodiment of the present disclosure, which has a design concept similar to that of the base station antenna 500. Linear arrays 720-1 to 720-6 are respectively mounted to corresponding cavity elements 710-1 to 710-6 to form respective column components (not shown). These column components are fixedly positioned through the brackets 530 and 540 according to the desired lateral position relations, so that the reflectors having substantially flat forward surfaces provided by each of the cavity elements 710 are basically coplanar and separated from each other. The base station antenna 700 further includes metal plates 750-1 to 750-7 having functions similar to those of the metal plates 550-1 to 550-3 in the base station antenna 500, as will be described in detail below with reference to FIG. 17C. The metal plate 750-1 is located in the middle of the base station antenna 700, its first edge part is located on the front side of the edge part of the reflector provided by the cavity element 710-5 and overlaps the edge part back and forth to form a capacitive coupling connection, and its second edge part is located on the front side of the edge part of the reflector provided by the cavity element 710-6 and overlaps the edge part back and forth to form a capacitive coupling connection, so that the metal plate 750-1 makes the reflectors provided by each of the cavity elements 710-5 and 710-6 commonly grounded. Similarly, the metal plate 750-4 makes the reflectors provided by each of the cavity elements 710-1 and 710-3 commonly grounded, the metal plate 750-5 makes the reflectors provided by each of the cavity elements 710-1 and 710-5 commonly grounded, the metal plate 750-6 makes the reflectors provided by each of the cavity elements 710-2 and 710-6 commonly grounded, and the metal plate 750-7 makes the reflectors provided by each of the cavity elements 710-2 and 710-4 commonly grounded. The metal plates 750-2 and 750-3 are symmetrically arranged on two lateral edge parts of the base station antenna 700. Each of the metal plate 750-2 and 750-3 has a first part extending parallel to the substantially flat forward surfaces of the reflectors provided by the cavity element 710, and a second part extending from the first part to the front. The edge parts of the first parts of the metal plates 750-2 and 750-3 are respectively located at the front sides of the edge parts of the reflectors provided by the cavity elements 710-3 and 710-4 and overlap the edge parts back and forth to form a capacitive coupling connection, so that the metal plates 750-2 and 750-3 and the reflectors provided by the cavity elements 710-3 and 710-4 are commonly grounded respectively. The second parts of the metal plates 750-2 and 750-3 are used to adjust the radiation pattern of each linear array 720. In this way, each reflector (provided by each cavity element 710) and each metal plate 750 that have the function of reflecting electromagnetic radiation of each linear array 720 of the base station antenna 700 are commonly grounded.

Figure 18:
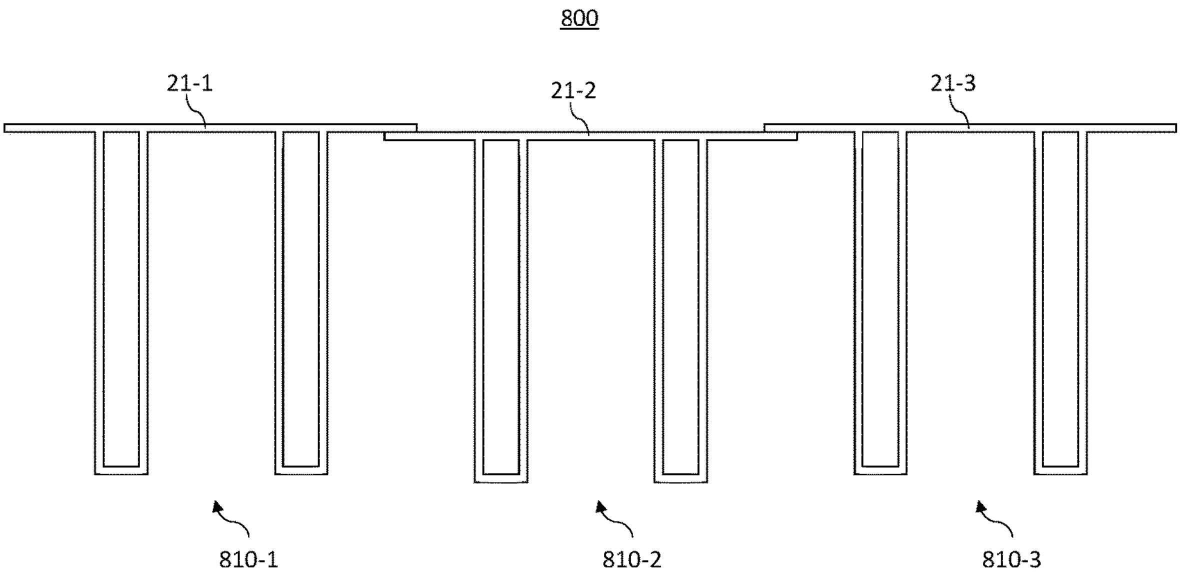
FIG. 18 is a bottom view of a base station antenna according to an embodiment of the present disclosure.

FIG. 18 shows a base station antenna 800 according to an embodiment of the present disclosure. The base station antenna 800 includes a plurality of cavity elements 810-1 to 810-3, and each cavity element 810 has planar elements 21-1 to 21-3 that can be used as reflectors. Each cavity element 810 of the base station antenna 800 is positioned such that the plurality of reflectors (provided by each cavity element 810) are separated from each other in the front-to-rear direction (that is, not having an electrical connection like the embodiment shown in FIG. 12A). As shown in the figure, the cavity element 810-2 is located in the middle of the base station antenna 800. A first edge part of the planar element 21-2 of the cavity element 810-2 is located at the front side of the edge part of the planar element 21-1 of the cavity element 810-1 and overlaps the edge part back and forth (and understandably, a thin layer of dielectric material is filled in between) to form a capacitive coupling connection, a second edge part of the planar element 21-2 of the cavity element 810-2 is located at the front side of the edge part of the planar element 21-3 of the cavity element 810-3 and overlaps the edge part back and forth to form a capacitive coupling connection, so that the reflectors provided by each of the cavity elements 810-1 to 810-3 are commonly grounded. In this embodiment, the base station antenna 800 may not include a metal plate for commonly grounding the reflectors provided by each cavity element 810, and has a simplified structure which is more convenient for assembly.

The brackets 530 and 540 for fixedly positioning each cavity element (or column component) in the base station antenna will be described below with reference to FIG. 15A to FIG. 16C. The brackets 530 and 540 are both formed of a dielectric material. The bracket 530 and/or the bracket 540 need to play a role of fixing and supporting, and thus they need to have a higher rigidity. In the base station antennas 500 and 700, the bracket 530 is fixed at an end (that is, an upper end and/or a lower end) of the base station antennas 500 and 700 in the longitudinal direction, and the bracket 540 is fixed in the middle of the base station antennas 500 and 700 in the longitudinal direction (a plurality of brackets 540 may be provided as needed). Each cavity element has a groove 532 extending in the front-to-rear direction, and the bracket has a plurality of grooves 531 respectively matched with each of the grooves 532. The bracket 530 fixedly positions the plurality of cavity elements through the matching between the corresponding grooves 531 and 532 and screws 534 for fastening. The rear surface (the bottom surface, which may include the planar element 22 and the part of the planar element 22 near the planar element 23) of each cavity element has a hole 542, and the bracket 540 has a plurality of protrusions 541 respectively matched with each hole 542. The bracket 540 fixedly positions the plurality of cavities by inserting the protrusions 541 into the corresponding holes 542 in the longitudinal direction of the antenna and through fasteners 543 for fastening. As shown in FIG. 17B, the bracket 540 may further be mechanically connected with a mounting bracket 771 for mounting a base station antenna. In other embodiments, the bracket 530 and/or the bracket 540 may be made of a metal material. The bracket 530 and/or the bracket 540 can make each cavity element and the reflector provided by the cavity element commonly grounded.

In view of the above, the present disclosure provides many different embodiments. Some embodiments of the present disclosure provide a base station antenna. The base station antenna may include a reflector. The antenna may include a first radiator located at the front side of the reflector. The antenna may include mutually parallel first and second ground plates extending backward from the reflector and basically perpendicular to the reflector. The antenna may include a first conductor strip extending between the first and second ground plates and configured to feed power to the first radiator, the first conductor strip and the first and second ground plates may be configured as a first stripline transmission line. The antenna may include the reflector and the first and second ground plates may be configured as one piece so that the reflector may be grounded via the first and second ground plates without soldering.

In some embodiments, one or more of the following features may be included. The base station antenna may include: a printed circuit board located between the reflector and the first radiator, the front surface of the printed circuit board may be printed with conductor traces configured to feed the first radiator, the rear surface of the printed circuit board may be printed with a conductor plane, the first conductor strip may be electrically connected to the conductor traces and the conductor plane may be grounded by being electrically coupled to the reflector. The first conductor strip may have a projecting part extending and passing through the reflector and the printed circuit board in front of the reflector, and the projecting part may be soldered to the conductor trace. The front surface of the printed circuit board may be printed with conductor traces configured to feed the first radiator, the first conductor strip may be electrically connected to the conductor traces, and the rear surface of the printed circuit board abuts against the front surface of the reflector, so that the reflector acts as a ground plane for the conductor traces.

The base station antenna according to some embodiments may include a second radiator located at the front side of the reflector, and the first and second radiators may be configured to transmit and receive radio frequency signals along the first and second polarization directions, respectively; mutually parallel third and fourth ground plates extending backward from the reflector basically perpendicular to the reflector; and a second conductor strip extending between the third and fourth ground plates and configured to feed the second radiator, the second conductor strip and the third and fourth ground plates constitute a second stripline transmission line laterally adjacent to the first stripline transmission line, the reflector and the first to fourth ground plates may be constructed as one piece so that the reflector may be grounded via the first to fourth ground plates without soldering; and the second and fourth ground plates may be configured as the same ground plate.

The base station antenna according to some embodiments may include: a transition piece configured to connect a coaxial transmission line feeding the base station antenna to the first stripline transmission line. The coaxial transmission line may include an inner conductor and an outer conductor, and the transition piece may include a first transition piece and a second transition piece, the inner conductor may be electrically connected to the first conductor strip via the first transition piece, and the outer conductor may be electrically coupled to the first and second ground plates via the second transition piece. The first conductor strip may be sheet metal. The first conductor strip may be a conductor line printed on a dielectric substrate. The conductor lines may include first and second lines printed on opposite first and second surfaces of the dielectric substrate respectively, and the projection of at least the first part of the first line on the dielectric substrate may coincide or completely coincide with the projection of the second line on the dielectric substrate. The first line and the second line may be electrically connected via a conductive through-hole passing through the dielectric substrate.

The base station antenna according to some embodiments may include a moving element movable relative to the first conductor strip. The moving element may be configured to be able to change the phase shift brought by the first stripline transmission line to the signal transmitted thereon by its movement.

The base station antenna according to some embodiments may include a holder configured to hold a first conductor strip component approximately halfway between the first and second ground plates. The holder may be made of a dielectric material. An opening may be provided in the holder to reduce the covering area of the holder on the first conductor strip component. The surface of the holder close to the first conductor strip component may have an indented part. The covering area of the holder on the first conductor strip component may be less than 10% of the area of the first conductor strip component. The holder may include first and second parts, the first part having a thickness smaller than the second part in the thickness direction of the holder from the first conductor strip component to the corresponding ground plate, so as to reduce the dielectric constant of a medium between the first conductor strip component and the corresponding ground plate. The surface of the holder close to the first conductor strip component and/or the surface close to the ground plate may have a reduced thickness. The first conductor strip component may include a dielectric substrate and the first conductor strip printed on the dielectric substrate, and the holder may be positioned between the dielectric substrate and the first ground plate, and between the dielectric substrate and the second ground plate so that the holder basically does not cover the first conductor strip.

The base station antenna according to some embodiments may include partition plates located at the rear side of the reflector and extending basically parallel to the reflector. The partition plates may be respectively connected with the edges of the first and second ground plates which may be far away from the reflector, and the partition plates and the first and second ground plates may be constructed as an integral piece. In some embodiments, a support may be mounted on the partition plate, and the support may be configured to support the first conductor strip forwardly so that a first part of the first conductor strip extends and passes through the reflector from the front of the reflector to facilitate connection with a circuit element located at a front side of the reflector.

In some embodiments, the first stripline transmission line may include first and second sections, each of which may be configured to extend from the reflector, the conductor strip of the first section and the conductor strip of the second section may be electrically coupled by a connector. In some embodiments, the second section may be laterally adjacent the first section, and the ground plates adjacent to each other of the first and second sections may be configured as a common ground plate. The base station antenna according to some embodiments may include a pair of partition plates located at the rear side of the reflector and extending basically parallel to the reflector. The partition plates may be respectively connected with the edges of the ground plates of the first and second sections far away or distal from the reflector, the partition plates and the ground plates of the first and second sections may be constructed as an integral piece respectively, and the partition plates and/or the same ground plate may be provided with holes for the connector to pass through. The first section may include a first part of the first stripline transmission line with a first electrical distance to the first radiator, and the second section includes a second part of the first stripline transmission line with a second electrical distance to the first radiator, the second electrical distance may be less than the first electrical distance.

Some embodiments of the present disclosure provide a base station antenna. The base station antenna may include a reflector. The antenna may include a first radiator located at the front side of the reflector. The antenna may include a first cavity element located at the rear side of the reflector, the first cavity element may include mutually parallel first and second ground plates extending backward from the rear side of the reflector and basically perpendicular to the rear side of the reflector, and each of the first and second ground plates has a first edge part close to the reflector. The antenna may include a first conductor strip extending between the first and second ground plates and configured to feed the first radiator, the first conductor strip and the first and second ground plates constitute a first stripline transmission line. The antenna may include a first dielectric layer located between the first edge parts of the first and second ground plates and the reflector. The antenna may include the first edge part of the first ground plate extends laterally away from the first conductor strip to form a first coupling part which may be basically parallel to the rear surface of the reflector. The antenna may include the first edge part of the second ground plate extends laterally away from the first conductor strip to form a second coupling part which may be basically parallel to the rear surface of the reflector. The antenna may include the first and second coupling parts may be respectively electrically coupled to the reflector via the first dielectric layer, so that the reflector may be grounded via the first cavity element without soldering.

In some embodiments, one or more of the following features may be included. The base station antenna may include: a printed circuit board located between the reflector and the first radiator, the front surface of the printed circuit board may be printed with conductor traces configured to feed the first radiator, the rear surface of the printed circuit board may be printed with a conductor plane, the first conductor may be electrically connected to the conductor traces and the conductor plane may be grounded by being electrically coupled to the reflector.

The base station antenna may include a pin configured to electrically connect the first cavity element to the conductor plane so that the first cavity element, the conductor plane, and the reflector may be grounded in common. The second coupling part, the reflector and the printed circuit board respectively may include first to third position-corresponding openings, the pin may pass through the first to third openings in sequence, the pin may be electrically connected to the second coupling part through pressure riveting process, and to the conductor traces printed on the upper surface of the printed circuit board by soldering, and the pin may be not electrically connected to the reflector.

The base station antenna may include: a printed circuit board located between the reflector and the first radiator, and the front surface of the printed circuit board may be printed with conductor traces configured to feed the first radiator. The first conductor strip may be electrically connected to the conductor traces, and the rear surface of the printed circuit board may abut against the front surface of the reflector, so that the reflector acts as a ground plane for the conductor traces.

In some embodiments, the first conductor strip may have a protruding part extending and passing through the reflector and the printed circuit board in front of the reflector, and the protruding part may be soldered to the conductor trace.

In some embodiments, the first cavity element may include a third ground plate and a fourth ground plate which may be parallel to each other and extend backward from the rear surface of the reflector and may be basically perpendicular to the rear surface of the reflector, and each of the third and fourth ground plates has a first edge part close to the reflector; and the base station antenna further may include: a second radiator located at the front side of the reflector, the first and second radiators may be configured to transmit and receive radio frequency signals along the first and second polarization directions, respectively; a second conductor strip extending between the third and fourth ground plates and configured to feed the second radiator, the second conductor strip and the third and fourth ground plates constitute a second stripline transmission line laterally that may be adjacent the first stripline transmission line; and a second dielectric layer between the first edge parts of the third and fourth ground plates and the reflector, the first edge part of the third ground plate extends laterally away from the second conductor strip and out of a third coupling part which may be basically parallel to the rear surface of the reflector; the first edge of the fourth ground plate extends laterally away from the second conductor strip and out of a fourth coupling part which may be basically parallel to the rear surface of the reflector; the third and fourth coupling parts may be each electrically coupled to the reflector via the second dielectric layer, so that the reflector may be grounded via the first cavity element without soldering; and the second and fourth coupling parts adjacent to each other may be configured as the same coupling part. In some embodiments, the length of the same coupling part extending laterally may be not less than half of the length of any of the first and third coupling parts extending transversely.

In some embodiments, the first conductor strip may be a conductor line printed on a dielectric substrate, the conductor line may include first and second lines printed on the opposite first and second surfaces of the dielectric substrate respectively, and the projection of the first part of the first line on the dielectric substrate may coincide or may completely coincides with the projection of the second line on the dielectric substrate, the first line and the second line may be electrically connected through a conductive through hole passing through the dielectric substrate.

The base station antenna according to some embodiments may include a holder configured to hold the first conductor strip approximately halfway between the first and second ground plates. An opening may be formed on the holder to reduce the covering area of the first conductor strip by the holder. A first part of the holder may have a reduced thickness to reduce the dielectric constant of the medium between the first conductor strip and the corresponding ground plate.

In some embodiments, the first cavity element may include: partition plates located at the rear side of the reflector and extending basically parallel to the reflector, the partition plates may be respectively connected with the second edge parts of the first and second ground plates opposite to the first edge parts, the partition plate and the first and second ground plates may be constructed as one piece.

Some embodiments of the present disclosure may provide a feeder component for feeding a column of radiators configured to operate in a first polarization direction of a base station antenna. The feeder component may include a stripline transmission line located at the rear side of the reflector and basically perpendicular to the reflector. The stripline transmission line may include first and second ground plates that are parallel to each other, and a conductor strip extending between the first and second ground plates. The conductor strip may have an input part and a plurality of output parts. The first and second ground plates may be electrically connected to an outer conductor of a coaxial transmission line for feeding the column. The input part may be electrically connected to the inner conductor of the coaxial transmission line. The plurality of output parts may be configured to be electrically connected to the column to feed the column. The first and second ground plates may be constructed as one piece with the reflector, so that the reflector may be grounded via the first and second ground plates without soldering.

In some embodiments, one or more of the following features may be included. The feeder component may include a plurality of micro-strip transmission lines located at the front side of the reflector for feeding the column. Each of the micro-strip transmission lines may include a conductor trace printed on the front surface of a dielectric substrate and a conductor plane printed on the rear surface of the dielectric substrate, each of the output parts may be electrically connected to a respective one of the conductor traces, and the conductor plane may be grounded by being electrically coupled to the reflector. Each of the output parts may extend and pass through the reflector and the dielectric substrate to be soldered to the respective conductor traces in front of the reflector. The feeder component may include a plurality of pins extending and passing through the reflector and the dielectric substrate, and a first end of each pin may extend in between the first and second ground plates to be electrically connected to the corresponding output part, and a second end of each pin extends to the front side of the dielectric substrate to be electrically connected to a corresponding conductor trace.

In some embodiments, the column may include a first radiator, the plurality of output parts may include a first output part, and the plurality of micro-strip transmission lines may include a first micro-strip transmission line, the first output part may be electrically connected to the conductor trace of the first micro-strip transmission line, and the conductor trace of the first micro-strip transmission line may be configured to feed the first radiator without feeding any radiators other than the first radiator.

In some embodiments, the column includes adjacent first and second radiators, the plurality of output parts includes a first output part, and the plurality of micro-strip transmission lines includes a first micro-strip transmission line, the first output part may be electrically connected to the conductor trace of the first micro-strip transmission line, and the conductor trace of the first micro-strip transmission line may be configured to feed the first and second radiators.

The feeder component may include a first transition piece electrically connecting the input part to the inner conductor. The first transition piece may include: a first joint part configured in a curved shape so as to be welded to the inner conductor to at least partially surround the inner conductor; and a second joint part configured to be electrically connected to the input part. An input part of the conductor strip may be formed at an edge of the stripline transmission line away from the reflector, the coaxial transmission line may be positioned near the input part, the second joint part may be configured to protrude between the first and second ground plates so as to be electrically connected to the input part. The second joint part may be configured in a flat shape to facilitate soldering and/or screw connection to the input part in a plane contact manner.

The feeder component may include a transition printed circuit board on the front surface of the reflector, the input part of the conductor strip may be configured to extend and pass through the reflector and the transition printed circuit board to the front of the reflector, and the coaxial transmission line may be positioned near the input part on the rear side of the reflector. The first transition piece may extend and pass through the reflector and the transition printed circuit board such that the first joint part may be located at the rear side of the reflector and the second joint part may be located at the front side of the transition printed circuit board, and the second joint part may be electrically connected to the input part via conductor traces printed on the transition printed circuit board.

The feeder component may include a second transition piece electrically connecting the first and second ground plates to the outer conductor. The second transition piece may include: a first joint part configured in a curved shape so as to be welded to the outer conductor in such a manner as to at least partially surround the outer conductor; and a second joint part configured to be electrically connected to the first and second ground plates. The edges of the first and second ground plates far away or distal from the reflector may extend out of the extension part basically parallel to the reflector, and the second joint part may be flat and may be electrically coupled to the extension part so as to be electrically connected to the first and second ground plates.

The feeder component may include a transition printed circuit board on the front surface of the reflector. The rear surface of the transition printed circuit board may be printed with a conductor plane electrically coupled to the reflector, the coaxial transmission line may be positioned at the rear side of the reflector close to the reflector; the transition printed circuit board may be provided with a conductive through hole, and the second joint part may pass through and may be electrically connected to the conductive through hole to be electrically connected to the conductor plane and thus further to the first and second ground plates.

The feeder component may include a moving element movable relative to the conductor strip. The moving element may be configured to be able to change the phase shift injected by the stripline transmission line to the signal transmitted thereon by its movement.

Some embodiments of the present disclosure provide a frame for a base station antenna. The frame may include a first planar element extending along a first plane, with a first side of the first planar element configured to reflect electromagnetic radiation of the base station antenna. The frame may include mutually parallel second and third planar elements extending basically perpendicularly from a second side of the first planar element, and the second and third planar elements may be configured to define a first chamber for a first conductor strip. The frame may include the first to third planar elements may be configured as one piece so as to be commonly grounded.

In some embodiments, one or more of the following features may be included. The frame may include a fourth planar element extending basically perpendicularly from the first planar element to the second side of the first planar element and parallel to the third planar element, the third and fourth planar elements may be configured to define a second chamber for a second conductor strip, and the first to fourth planar elements may be configured as one piece so as to be commonly grounded.

The frame may include a fifth planar element parallel to the first plane located on the second side of the first planar element. The fifth planar element may be connected with a rear edge of each of the second to fourth planar elements, so that each of the first and second chambers may be basically closed, and the fifth planar element and the first to fourth planar elements may be formed as one piece so as to be commonly grounded. The fifth planar element may have a first opening so that the first and second conductor strips may be connected with circuit elements located outside the first and second chambers, respectively. The fifth planar member may have a second opening for mounting a support for supporting the first and second conductor strips in a direction toward the first side of the first planar member. At least one end of the first chamber along the length direction may be open to accommodate the first conductor strip, and at least one end of the second chamber along the length direction may be open to accommodate the second conductor strip. The first to fifth planar elements may be configured as a first cavity element, and the frame further may include a second cavity element having the same structure as the first cavity element, the first cavity element may be connected to the second cavity element by a friction stir soldering process. The first cavity element may be connected to the second cavity element along the length direction. The first to fifth planar elements may be configured as a first cavity element, and the frame further may include a second cavity element having the same structure as the first cavity element, the first cavity element and the second cavity element may be positioned laterally adjacent and separate from each other so that the first planar element of the first cavity element and the first planar element of the second cavity element may be basically coplanar. The first to fifth planar elements may be configured as a first cavity element, and the frame further may include a second cavity element having the same structure as the first cavity element, the first cavity element and the second cavity element may be positioned separate from each other so that an edge part of the first planar element of the first cavity element overlaps an edge part of the first planar element of the second cavity element. The fifth planar element may have an extension extending beyond the second and/or fourth planar element to connect a mounting bracket for mounting the base station antenna. The second planar element may be close to the first edge part of the first planar element, and the extension may extend beyond the second planar element at least in the direction toward the first edge part. The first to fifth planar elements may be integrally formed based on a metal material using a pultrusion process. Each of the first to fifth planar elements may extend basically along the entire length of the base station antenna.

The base station antenna may include a dual-polarized radiating element located on a first side of the first planar element, the second to fourth planar elements may be positioned to facilitate the feeding by the first and second conductor strips to the radiators of the dual-polarized radiating element operating in two polarization directions, respectively. The first planar element may have a third opening so that the first conductor strip protrudes to a first side of the first planar element to be connected with a circuit element located at the first side of the first planar element.

The base station antenna may include first and second columns of radiators arranged along the length direction on the first side of the first planar element, and the frame further may include: mutually parallel sixth and seventh planar elements extending basically perpendicularly from the first planar element to the second side of the first planar element, the sixth and seventh planar elements may be configured to define a third chamber for a third conductor strip, the first to third, sixth and seventh planar elements may be formed as one piece so as to be grounded together, the second and third planar elements may be positioned to facilitate feeding of the first conductor strip to the first column of radiators, and the sixth and seventh planar elements may be positioned to facilitate feeding of the third conductor strip to the second column of radiators. The first column of radiators may operate in a first frequency band and the second column of radiators operates in a second frequency band, and the width of the first chamber may be basically equal to that of the second chamber.

Some embodiments of the present disclosure provide a reflector for a base station antenna. The reflector may include a plurality of sub-reflectors extending in the longitudinal direction of the base station antenna. Each of the plurality of sub-reflectors may be configured to be mounted with a radiating element of the base station antenna. The plurality of sub-reflectors may be fixedly positioned such that the plurality of sub-reflectors may be separated from each other, and the plurality of sub-reflectors may be commonly grounded.

In some embodiments, one or more of the following features may be included. The plurality of sub-reflectors may be fixedly positioned such that a substantially flat forward surface of a first sub-reflector of the plurality of sub-reflectors and a substantially flat forward surface of a second sub-reflector of the plurality of sub-reflectors adjacent to the first sub-reflector may be basically coplanar. The substantially flat forward surface of the first sub-reflector and the substantially flat forward surface of the second sub-reflector may be both electrically connected to an outer conductor of a radio frequency cable for feeding the radiating elements of the base station antenna so that the first and the second sub-reflectors may be commonly grounded.

The reflector may include a metal bracket, and the plurality of sub-reflectors may be mounted on the metal bracket so as to be fixedly positioned. The substantially flat forward surface of the first sub-reflector and the substantially flat forward surface of the second sub-reflector may be both electrically connected to the metal bracket so that the first and the second sub-reflectors may be commonly grounded.

The reflector may include a metal plate, and a first edge part of the metal plate may overlap an edge part of the first sub-reflector adjacent the second sub-reflector to form a first capacitive coupling connection. A second edge part of the metal plate may overlap an edge part of the second sub-reflector adjacent the first sub-reflector to form a second capacitive coupling connection, so that the first and the second sub-reflectors may be commonly grounded.

The plurality of sub-reflectors may be fixedly positioned such that an edge part of a first sub-reflector of the plurality of sub-reflectors adjacent a second sub-reflector and an edge part of the second sub-reflector adjacent the first sub-reflector overlap to form a capacitive coupling connection between the first and the second sub-reflectors, so that the first and the second sub-reflectors may be commonly grounded.

The reflector may include a metal element, which has a first part extending parallel to a substantially flat forward surface of a third sub-reflector of the plurality of sub-reflectors, and a second part extending from the first part to the front of the base station antenna, the third sub-reflector being located at a lateral edge part of the reflector component. The edge part of the first part and the edge part of the forward surface of the third sub-reflector overlap back and forth to form a capacitive coupling connection, so that the metal element and the third sub-reflector may be commonly grounded, and the second part may be configured to adjust a radiation pattern of the base station antenna.

Some embodiments of the present disclosure provide a reflector for a base station antenna. The reflector may include a first cavity element. The reflector may include a second cavity element. Each cavity element may include a planar part extending in the longitudinal direction of the base station antenna and a cavity part extending basically perpendicularly from the planar part to the rear of the base station antenna, and each planar part may be configured to be mounted with the radiating elements of the base station antenna and reflect electromagnetic radiation of the base station antenna. The cavity part may be configured to accommodate at least part of a circuit for feeding the radiating elements. The first and the second cavity elements may be positioned such that the first cavity element and the second cavity element may be separated from each other.

In some embodiments, one or more of the following features may be included. The first and second cavity elements may be positioned such that the planar part of the first cavity element and the planar part of the second cavity element may be laterally adjacent and basically coplanar. The reflector may include a metal plate, and first edge part of the metal plate may overlap an edge part of the planar part of the first cavity element adjacent to the second cavity element back and forth to form a first capacitive coupling connection. A second edge part of the metal plate may overlap an edge part of the planar part of the second cavity element adjacent to the first cavity element back and forth to form a second capacitive coupling connection, so that the planar part of the first cavity element and the planar part of the second cavity element may be commonly grounded.

The first and the second cavity elements may be positioned such that an edge part of the planar part of the first cavity element adjacent the second cavity element and an edge part of the planar part of the second cavity element adjacent the first cavity element overlap to form a capacitive coupling connection, so that the planar part of the first cavity element and the planar part of the second cavity element may be commonly grounded.

The reflector may include a first bracket formed of a dielectric material. The cavity part of each of the first and second cavity elements may have a first groove extending in a front-to-rear direction, the first bracket may have second grooves respectively matched with each of the first grooves, and the first bracket may be configured to position the first and second cavity elements through the matching of the first groove and the corresponding second groove. The rear surface of the cavity part of each of the first and second cavity elements may have a hole, the second bracket may have protrusions matched with each of the holes, and the second bracket may be configured to position the first and second cavity elements by inserting the protrusions into the corresponding holes in the longitudinal direction.

Some embodiments of the present disclosure provide a column component for a base station antenna. The column component may include a reflector extending in the longitudinal direction of the base station antenna. The component may include a linear array of radiating elements extending in the longitudinal direction of the base station antenna, each radiating element in the linear array being mounted to the reflector so as to extend forwardly from the reflector. The component may include a cavity extending basically perpendicularly from the reflector to the rear of the base station antenna, the cavity being configured to accommodate at least part of a circuit for feeding the linear array. The component may include the column component may be positioned to be separated from other column components.

In some embodiments, one or more of the following features may be included. The column component may be further positioned such that the substantially flat forward surface of the reflector and the substantially flat forward surfaces of reflectors of the other column components may be basically coplanar. The column component may be further positioned such that the substantially flat forward surface of the reflector and the substantially flat forward surface of a reflector adjacent to the column component in the other column components overlap.

Some embodiments of the present disclosure provide a base station antenna. The base station antenna may include a plurality of reflectors extending in the longitudinal direction of the base station antenna. The antenna may include a plurality of linear arrays extending in the longitudinal direction of the base station antenna, each linear array including a plurality of radiating elements mounted to a corresponding reflector so as to extend forwardly from the corresponding reflector. The antenna may include the plurality of reflectors may be fixedly positioned such that the plurality of reflectors may be separated from each other and each linear array may have the same azimuth-angle visual-axis pointing direction.

In some embodiments, one or more of the following features may be included. The plurality of reflectors may be fixedly positioned such that the substantially flat forward surface of the first reflector in the plurality of reflectors and the substantially flat forward surface of another reflector in the plurality of reflectors other than the first reflector may be basically coplanar. The base station antenna may include a metal plate. A first edge part of the metal plate may overlap an edge part of the first reflector adjacent to the second reflector back and forth to form a first capacitive coupling connection, and a second edge part of the metal plate may overlap an edge part of the second reflector adjacent to the first reflector back and forth to form a second capacitive coupling connection, so that the first and the second reflectors may be commonly grounded. The plurality of reflectors may be fixedly positioned such that an edge part of the first reflector in the plurality of reflectors adjacent to the second reflector and an edge part of the second reflector adjacent to the first reflector overlap back and forth to form a capacitive coupling connection between the first and second reflectors, so that the first and second reflectors may be commonly grounded.

The base station antenna may include a metal element which has a first part extending parallel to a substantially flat forward surface of a third reflector of the plurality of reflectors, and a second part extending from the first part to the front of the base station antenna, the third reflector being located at a lateral edge part of the base station antenna. The edge part of the first part and the edge part of the forward surface of the third reflector may overlap back and forth to form a capacitive coupling connection, so that the metal element and the third reflector may be commonly grounded, and the second part may be configured to adjust a radiation pattern of the base station antenna.

The base station antenna may include a plurality of cavities extending in the longitudinal direction of the base station antenna. Each of the cavities may extend basically perpendicularly from a corresponding reflector to the rear of the base station antenna, and the cavity may be configured to form a stripline transmission line with at least part of a circuit for feeding a corresponding linear array accommodated in the cavity. Each of the cavities and the corresponding reflector may be constructed as one piece. The radiating element may be a dual-polarized radiating element, each cavity may include a first chamber and a second chamber, configured to respectively accommodate at least part of a circuit for feeding a corresponding polarization of the radiating element, the first chamber and the second chamber may be laterally spaced apart by a predetermined distance to facilitate the mounting of the radiating element to the corresponding reflector.

The base station antenna may include a first bracket formed of a dielectric material. Each of the plurality of cavities has a first groove extending in a front-to-rear direction, the first bracket has a plurality of second grooves respectively matched with the first grooves, and the first bracket may be configured to fixedly position the plurality of cavities through the matching of the first groove and the corresponding second groove. The first bracket may be fixed at an end of the base station antenna in the longitudinal direction. The rear surface of each of the plurality of cavities has a hole, the second bracket has a plurality of protrusions respectively matched with the positions of the holes, and the second bracket may be configured to fixedly position the plurality of cavities by inserting the protrusions into the corresponding holes in the longitudinal direction. The second bracket may be fixed in the middle of the base station antenna in the longitudinal direction. The second bracket may be configured to be connected with a mounting bracket for mounting the base station antenna.

Although some specific embodiments of the present disclosure have been described in detail by examples, those skilled in the art should understand that the above examples are only for illustration, not for limiting the scope of the present disclosure. The embodiments disclosed herein can be combined arbitrarily without departing from the spirit and scope of the present disclosure. Those skilled in the art should also understand that various modifications can be made to the embodiments without departing from the scope of the present disclosure. The scope of the present disclosure is defined by the following claims.

What is claimed is:

1. A reflector for a base station antenna, comprising:

a plurality of sub-reflectors extending in a longitudinal direction of the base station antenna, wherein, each of the plurality of sub-reflectors is configured to be mounted with a radiating element of the base station antenna; and the plurality of sub-reflectors are fixedly positioned such that the plurality of sub-reflectors are separated from each other, wherein the plurality of sub-reflectors are commonly grounded.

2. The reflector according to claim 1, wherein the plurality of sub-reflectors are fixedly positioned such that a substantially flat forward surface of a first sub-reflector of the plurality of sub-reflectors and a substantially flat forward surface of a second sub-reflector of the plurality of sub-reflectors adjacent to the first sub-reflector are basically coplanar.

3. The reflector according to claim 2, wherein the substantially flat forward surface of the first sub-reflector and the substantially flat forward surface of the second sub-reflector are both electrically connected to an outer conductor of a radio frequency cable for feeding radiating elements of the base station antenna so that the first and the second sub-reflectors are commonly grounded.

4. The reflector according to claim 2, further comprising:

a metal bracket, wherein, the plurality of sub-reflectors are mounted on the metal bracket so as to be fixedly positioned; and the substantially flat forward surface of the first sub-reflector and the substantially flat forward surface of the second sub-reflector are both electrically connected to the metal bracket so that the first and the second sub-reflectors are commonly grounded.

5. The reflector according to claim 2, further comprising:

a metal plate, wherein, a first edge part of the metal plate overlaps an edge part of the first sub-reflector adjacent the second sub-reflector to form a first capacitive coupling connection, a second edge part of the metal plate overlaps an edge part of the second sub-reflector adjacent the first sub-reflector to form a second capacitive coupling connection, so that the first and the second sub-reflectors are commonly grounded.

6. The reflector according to claim 1, wherein the plurality of sub-reflectors are fixedly positioned such that an edge part of a first sub-reflector of the plurality of sub-reflectors adjacent a second sub-reflector and an edge part of the second sub-reflector adjacent the first sub-reflector overlap to form a capacitive coupling connection between the first and the second sub-reflectors, so that the first and the second sub-reflectors are commonly grounded.

7. The reflector according to claim 1, further comprising:

a metal element, which has a first part extending parallel to a substantially flat forward surface of a third sub-reflector of the plurality of sub-reflectors, and a second part extending from the first part to a front of the base station antenna, the third sub-reflector being located at a lateral edge part of the reflector, wherein an edge part of the first part and an edge part of a forward surface of the third sub-reflector overlap back and forth to form a capacitive coupling connection, so that the metal element and the third sub-reflector are commonly grounded, and the second part is configured to adjust a radiation pattern of the base station antenna.

8. The reflector of claim 1, wherein each of the plurality of sub-reflectors is narrower than a radiator of the radiating element.

9. The reflector of claim 1, wherein the plurality of sub-reflectors are commonly grounded by capacitive coupling with each other or with a metal plate of the reflector.

10. The reflector of claim 1, wherein each of the plurality of sub-reflectors comprises a front surface and a feed plate on the front surface.

11. A reflector for a base station antenna, comprising:

a first cavity element; and a second cavity element, wherein, each cavity element includes a planar part extending in a longitudinal direction of the base station antenna and a cavity part extending basically perpendicularly from the planar part to a rear of the base station antenna, wherein the planar part is configured to be mounted with radiating elements of the base station antenna and reflect electromagnetic radiation of the base station antenna, the cavity part is configured to accommodate at least part of a circuit for feeding radiating elements of the base station antenna;

the first and the second cavity elements are positioned such that the first cavity element and the second cavity element are separated from each other.

12. The reflector according to claim 11, wherein the first and second cavity elements are positioned such that the planar part of the first cavity element and the planar part of the second cavity element are laterally adjacent and basically coplanar.

13. The reflector according to claim 12, further comprising:

a metal plate, wherein, a first edge part of the metal plate overlaps an edge part of the planar part of the first cavity element adjacent to the second cavity element back and forth to form a first capacitive coupling connection, a second edge part of the metal plate overlaps an edge part of the planar part of the second cavity element adjacent to the first cavity element back and forth to form a second capacitive coupling connection, so that the planar part of the first cavity element and the planar part of the second cavity element are commonly grounded.

14. The reflector according to claim 11, wherein the first and the second cavity elements are positioned such that an edge part of the planar part of the first cavity element adjacent the second cavity element and an edge part of the planar part of the second cavity element adjacent the first cavity element overlap to form a capacitive coupling connection, so that the planar part of the first cavity element and the planar part of the second cavity element are commonly grounded.

15. The reflector according to claim 11, further comprising:

a first bracket formed of a dielectric material, wherein the cavity part of each of the first and second cavity elements has a first groove extending in a front-to-rear direction, the first bracket has second grooves respectively matched with each of the first grooves, and the first bracket is configured to position the first and second cavity elements through the matching of the first groove and the corresponding second groove.

16. The reflector according to claim 11, further comprising:

a second bracket formed of a dielectric material, wherein a rear surface of the cavity part of each of the first and second cavity elements has a hole, the second bracket has protrusions matched with each of the holes, and the second bracket is configured to position the first and second cavity elements by inserting the protrusions into corresponding holes in the longitudinal direction.

17. A base station antenna, comprising:

a plurality of reflectors extending in a longitudinal direction of the base station antenna;

a plurality of cavities extending in the longitudinal direction of the base station antenna, and a plurality of linear arrays extending in the longitudinal direction of the base station antenna, each linear array including a plurality of radiating elements mounted to a corresponding reflector so as to extend forwardly from the corresponding reflector, wherein the plurality of reflectors are fixedly positioned such that the plurality of reflectors are separated from each other and such that the plurality of linear arrays have a same azimuth-angle visual-axis pointing direction; and wherein each of the cavities extends basically perpendicularly from a corresponding reflector to a rear of the base station antenna, and the cavity is configured to form a stripline transmission line with at least part of a circuit for feeding a corresponding linear array accommodated in the cavity.

18. The base station antenna according to claim 17, wherein each of the cavities and the corresponding reflector are constructed as one piece.

19. The base station antenna according to claim 17, wherein each radiating element is a dual-polarized radiating element, each cavity includes a first chamber and a second chamber, configured to respectively accommodate at least part of a circuit for feeding a corresponding polarization of a corresponding radiating element, wherein the first chamber and the second chamber are laterally spaced apart by a predetermined distance to facilitate mounting of the corresponding radiating element to the corresponding reflector.

20. The base station antenna according to claim 17, further comprising:

a first bracket formed of a dielectric material, wherein each of the plurality of cavities has a first groove extending in a front-to-rear direction, the first bracket has a plurality of second grooves respectively matched with the first grooves, and the first bracket is configured to fixedly position the plurality of cavities through the matching of the first groove and the corresponding second groove.

21. The base station antenna according to claim 20, wherein the first bracket is fixed at an end of the base station antenna in the longitudinal direction.

22. The base station antenna according to claim 17, further comprising:

a second bracket formed of a dielectric material, wherein a rear surface of each of the plurality of cavities has a hole, the second bracket has a plurality of protrusions respectively matched with positions of the holes, and the second bracket is configured to fixedly position the plurality of cavities by inserting the protrusions into corresponding holes in the longitudinal direction.

23. The base station antenna according to claim 22, wherein the second bracket is configured to be connected with a mounting bracket for mounting the base station antenna.

* * * * *